(12) United States Patent
Pingitore et al.

(10) Patent No.: US 12,466,922 B2
(45) Date of Patent: Nov. 11, 2025

(54) FILM EXTRUSION COMPOSITION AND ASSOCIATED EXTRUDED FILM, METALLIZED FILM, AND CAPACITOR

(71) Applicant: SHPP GLOBAL TECHNOLOGIES B.V., Bergen op Zoom (NL)

(72) Inventors: Andrew Thomas Pingitore, Evansville, IN (US); James Alan Mahood, Evansville, IN (US); Matthew Frank Niemeyer, North Chatham, NY (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 76 days.

(21) Appl. No.: 18/695,508

(22) PCT Filed: Jun. 30, 2022

(86) PCT No.: PCT/IB2022/056121
§ 371 (c)(1),
(2) Date: Mar. 26, 2024

(87) PCT Pub. No.: WO2023/047198
PCT Pub. Date: Mar. 30, 2023

(65) Prior Publication Data
US 2024/0409693 A1    Dec. 12, 2024

(30) Foreign Application Priority Data

Sep. 27, 2021    (EP) .................................... 21199122

(51) Int. Cl.
*C08G 77/448*    (2006.01)
*B29C 48/00*    (2019.01)
(Continued)

(52) U.S. Cl.
CPC .......... *C08G 77/448* (2013.01); *B29C 48/022* (2019.02); *B29C 48/08* (2019.02);
(Continued)

(58) Field of Classification Search
CPC ................................................... C08G 77/448
See application file for complete search history.

(56) References Cited

U.S. PATENT DOCUMENTS

| 3,929,678 A | 12/1975 | Laughlin et al. |
| 4,098,713 A | 7/1978 | Jones |

(Continued)

FOREIGN PATENT DOCUMENTS

| EP | 1479754 A1 | 11/2004 |
| EP | 3910001 A1 | 11/2021 |

(Continued)

OTHER PUBLICATIONS

Lee, C.H., Takagi, H., Okamoto, H. and Kato, M., 2015. Preparation and mechanical properties of a copolycarbonate composed of bio-based isosorbide and bisphenol A. Polymer Journal, 47(9), pp. 639-643. (Year: 2015).*

(Continued)

*Primary Examiner* — Nicholas R Krasnow
(74) *Attorney, Agent, or Firm* — CANTOR COLBURN LLP

(57) ABSTRACT

A film extrusion composition includes specific amounts of a heat-resistant copolycarbonate, a slip agent, and a particulate crosslinked polymethylsilsesquioxane having particles of a specific size. An extruded film prepared from the film extrusion composition exhibits a beneficial balance of telescoping, blocking, and dielectric properties. The extruded film is useful for forming electrostatic film capacitors.

15 Claims, 1 Drawing Sheet

(51) Int. Cl.
  *B29C 48/08*   (2019.01)
  *H01G 4/18*   (2006.01)
  *H01G 4/32*   (2006.01)
  *B29K 83/00*   (2006.01)
  *B29L 31/34*   (2006.01)

(52) U.S. Cl.
  CPC .............. *H01G 4/18* (2013.01); *H01G 4/32* (2013.01); *B29K 2083/00* (2013.01); *B29L 2031/34* (2013.01)

(56) References Cited

U.S. PATENT DOCUMENTS

| | | | |
|---|---|---|---|
| 4,116,885 | A | 9/1978 | Derstadt et al. |
| 4,153,570 | A | 5/1979 | Hennemann et al. |
| 4,316,824 | A | 2/1982 | Pancheri |
| 4,363,756 | A | 12/1982 | Sepulveda et al. |
| 4,704,233 | A | 11/1987 | Hartman et al. |
| 5,087,677 | A | 2/1992 | Brekner et al. |
| 5,173,207 | A | 12/1992 | Drapier et al. |
| 5,425,891 | A | 6/1995 | Pujol et al. |
| 5,549,840 | A | 8/1996 | Mondin et al. |
| 5,645,766 | A | 7/1997 | Shiro et al. |
| 5,904,735 | A | 5/1999 | Gutierrez et al. |
| 5,998,355 | A | 12/1999 | Brumbaugh |
| 6,423,678 | B1 | 7/2002 | Brumbaugh et al. |
| 6,723,864 | B2 | 4/2004 | Silva et al. |
| 6,903,064 | B1 | 6/2005 | Kasturi et al. |
| 7,079,372 | B2 | 7/2006 | Weber et al. |
| 8,389,662 | B2 | 3/2013 | De Brouwer et al. |
| 9,504,768 | B2 | 11/2016 | Fujita et al. |
| 9,567,445 | B2 * | 2/2017 | Mahood .............. C08G 64/12 |
| 9,587,201 | B2 | 3/2017 | Tomsheck et al. |
| 10,179,854 | B1 | 1/2019 | Chen et al. |
| 2004/0039145 | A1 | 2/2004 | Silva et al. |
| 2011/0207846 | A1 | 8/2011 | Monden |
| 2012/0153236 | A1 | 6/2012 | Cakmak et al. |
| 2014/0094545 | A1 | 4/2014 | Roncaglia et al. |
| 2014/0179843 | A1 * | 6/2014 | van der Mee ..... C08G 73/1071 525/461 |
| 2014/0234629 | A1 | 8/2014 | Sun et al. |
| 2014/0295363 | A1 | 10/2014 | Sun et al. |
| 2014/0343168 | A1 | 11/2014 | Griese et al. |
| 2016/0180985 | A1 | 6/2016 | Silvi et al. |
| 2017/0283650 | A1 | 10/2017 | Liu et al. |
| 2018/0079862 | A1 * | 3/2018 | Meyer .................. C08G 64/186 |
| 2019/0153217 | A1 | 5/2019 | Mahood et al. |
| 2019/0161576 | A1 | 5/2019 | Wehrmann et al. |
| 2019/0284391 | A1 | 9/2019 | Van De Wetering et al. |
| 2022/0010129 | A1 | 1/2022 | Mahood et al. |

FOREIGN PATENT DOCUMENTS

| | | |
|---|---|---|
| JP | H10294237 A | 11/1998 |
| JP | 2001228549 A | 8/2001 |
| JP | 2012528025 A | 11/2012 |
| JP | 2014068666 A | 4/2014 |
| JP | 2015117298 A | 6/2015 |
| JP | 2016032098 A | 3/2016 |
| KR | 102297409 B1 | 9/2021 |
| WO | 2000043474 A2 | 7/2000 |
| WO | 2004098953 A3 | 6/2005 |
| WO | 2013175448 A1 | 11/2013 |
| WO | 2013183521 A1 | 12/2013 |
| WO | 2014072923 A1 | 5/2014 |
| WO | 2015094151 A1 | 6/2015 |
| WO | 2016191103 A1 | 12/2016 |
| WO | 2017196922 A1 | 11/2017 |
| WO | 2019123029 A1 | 6/2019 |

OTHER PUBLICATIONS

International Search Report and Written Opinion for the corresponding International Application No. PCT/IB2022/056121, International Filing Date: Jun. 30, 2022; Date of Mailing: Oct. 17, 2022; 12 pages.

* cited by examiner

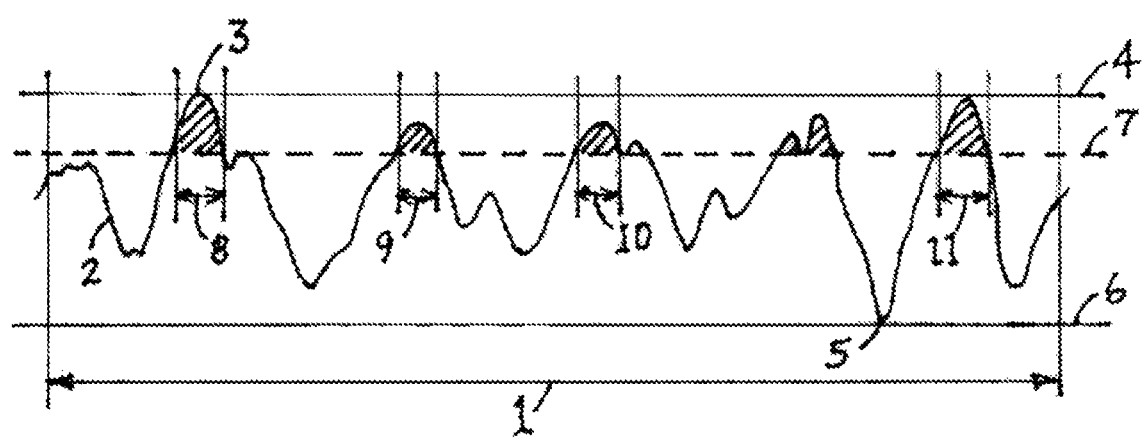

FILM EXTRUSION COMPOSITION AND ASSOCIATED EXTRUDED FILM, METALLIZED FILM, AND CAPACITOR

CROSS-REFERENCE TO RELATED APPLICATIONS

This application is a National Stage application of International Application No. PCT/IB2022/056121, filed Jun. 30, 2022, which claims the benefit of European Application No. 21199122.9 filed Sep. 27, 2021, the disclosures of both of which are incorporated herein by reference in their entirety.

BACKGROUND OF THE INVENTION

This application relates to a film extrusion composition, use of the composition to form an extruded film, and metallization of the film to form an electrostatic film capacitor. Electrostatic film capacitors with high volumetric energy density, high operating temperature, and long lifetime are critical components for pulse-power, automotive, and industrial electronics. Capacitors are essentially energy-storage devices having two parallel conductive plates separated by a thin layer of an electrically insulating (dielectric) film. When a voltage is applied across the plates, the electric field in the dielectric displaces electric charges, and thus stores energy. The amount of energy stored by a capacitor depends on the dielectric constant and breakdown voltage of the insulating material used to form the film, and the dimensions (total area and thickness) of the film. To maximize the amount of energy that a capacitor can accumulate, the dielectric constant and breakdown voltage of the film are maximized, and the thickness of the film is minimized. Because the physical characteristics of the dielectric material in the capacitor are the determining factors for the performance of a capacitor, improvements in one or more of the physical properties of the dielectric material in a capacitor can result in corresponding performance improvements in the capacitor component, usually resulting in performance and lifetime enhancements of the electronics system or product in which it is embedded.

Heat-resistant polycarbonate copolymers have been used in the formation of electrostatic film capacitors. See, for example, International Patent Application Nos. WO 2015/031627 A1, WO 2017/196922 A1, and WO 2020/102531 A1, all of Mahood et al. The process of converting a composition based on heat-resistant polycarbonate to a film capacitor requires many stages, including extruding the composition into a film, metallizing the film, slitting the metallized film, and winding the slitted metallized film into capacitors. There are multiple winding and unwinding steps involved in these stages. During winding, there is a risk of "telescoping," in which a roll of plastic film, initially cylindrical in shape, encounters an imbalance of forces causing the outer film layers to slide to one side or the other relative to the core and inner film layers. During unwinding, there is a risk of "blocking," in which layers cannot be separated from the roll without distortion or breaking of the film. The polycarbonate-based extrusion composition can be tailored to reduce telescoping, but such modifications often increase blocking. Similarly, modifications of the polycarbonate-based extrusion composition that reduce blocking often increase telescoping, and, critically, often detract from the dielectric properties of the film. There is therefore a desire for a composition based on heat-resistant polycarbonate that provides an improved balance of telescoping, blocking, and dielectric properties.

BRIEF SUMMARY OF EMBODIMENTS OF THE INVENTION

One embodiment is a film extrusion composition comprising, based on the total weight of the film extrusion composition: 50 to 99.35 weight percent of a copolycarbonate comprising, based on 100 mole percent total carbonate units in the copolycarbonate, 20 to 60 mole percent of first carbonate units having the structure

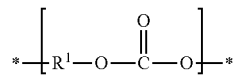

wherein $R^1$ is a $C_6$-$C_{16}$ divalent aromatic group; 40 to 80 mole percent of second carbonate units having the structure

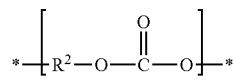

wherein $R^2$ is a $C_{17}$-$C_{40}$ divalent aromatic group having the structure

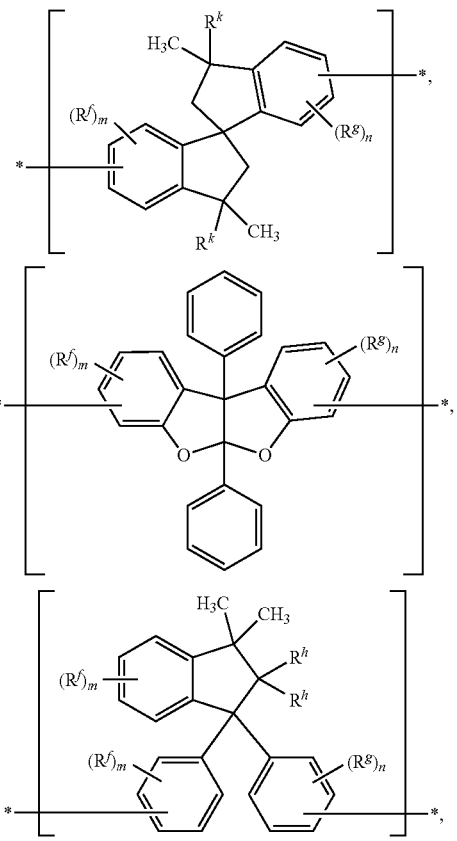

-continued

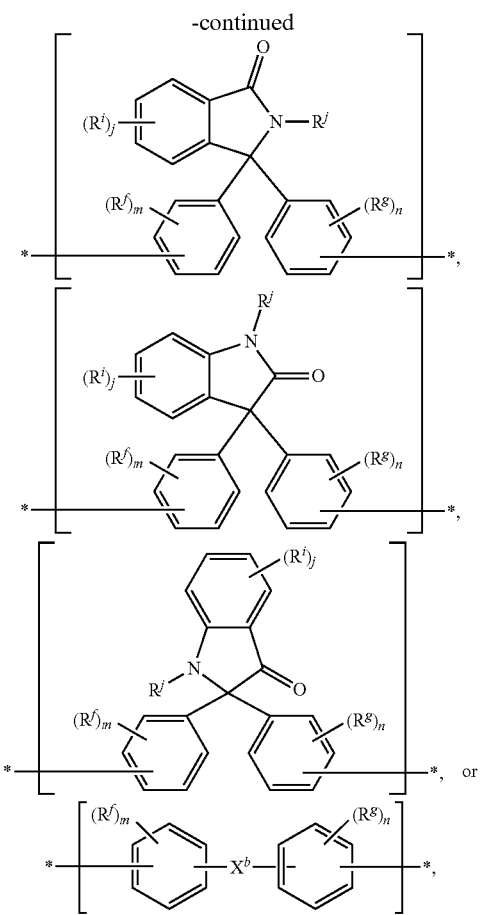

wherein $R^f$ and $R^g$ are each independently at each occurrence $C_1$-$C_{12}$ alkyl, $C_1$-$C_{12}$ alkoxyl, or $C_2$-$C_{12}$ alkenyl; each $R^h$ is hydrogen or two occurrence of $R^h$ combine with the carbon atom to which they are attached to form a carbonyl group; each occurrence of $R^i$ is independently $C_1$-$C_6$ alkyl; $R^j$ is hydrogen, $C_1$-$C_6$ alkyl, or phenyl optionally substituted with 1, 2, 3, 4, or 5 $C_1$-$C_6$ alkyl groups; $R^k$ is independently at each occurrence $C_1$-$C_3$ alkyl or phenyl, preferably methyl; $X^b$ is $C_6$-$C_{12}$ arylene, $C_4$-$C_{18}$ cycloalkylene, $C_4$-$C_{18}$ cycloalkylidene, or —C($R^m$)($R^n$)— wherein $R^m$ is hydrogen, $C_1$-$C_{12}$ alkyl, or $C_6$-$C_{12}$ aryl, and $R^n$ is $C_6$-$C_{10}$ alkyl, $C_6$-$C_8$ cycloalkyl, or $C_6$-$C_{12}$ aryl, or $X^b$ is -$(Q^a)_x$-G-$(Q^b)_y$-, wherein $Q^a$ and $Q^b$ are each independently $C_1$-$C_3$ alkylene, G is $C_3$-$C_{10}$ cycloalkylene, x is zero or 1, and y is zero or 1; and j, m, and n are each independently zero, 1, 2, 3, or 4; and 0 mole percent of third carbonate units, each third carbonate unit comprising a divalent carbonate group and a divalent polysiloxane group, the divalent polysiloxane group comprising 5 to 60 diorganosiloxane units having the structure

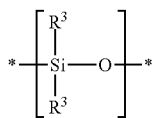

wherein each occurrence of $R^3$ is independently a $C_1$-$C_{13}$ hydrocarbyl group; 0.1 to 6 weight percent of a slip agent selected from the group consisting of pentaerythritol tetrastearate, dipentaerythritol hexastearate, glycerol tristearate, high density polyethylenes, polymethylpentenes, poly(carbonate-siloxane)s, and combinations thereof, and 0.55 to 0.8 weight percent of a particulate crosslinked polymethylsilsesquioxane having a number-based mean equivalent spherical diameter of 0.5 to 4 micrometers determined by electrical sensing zone method according to ISO 13319-1: 2021.

Another embodiment is an extruded film comprising the film extrusion composition in any of its variations described herein.

Another embodiment is a capacitor comprising: the extruded film; and an electrically conductive metal layer in contact with the extruded film.

Another embodiment is a metallized film comprising: the extruded film; and an electrically conductive metal layer in contact with the extruded film.

These and other embodiments are described in detail below.

BRIEF DESCRIPTION OF THE DRAWING

The FIGURE illustrates surface roughness characteristics used in the calculation of $t_p$ values, such as $t_p27$ and $t_p60$.

DETAILED DESCRIPTION OF THE INVENTION

The present inventors have determined that an improved balance of telescoping, blocking, and dielectric properties is provided by an extruded film that includes specific amounts of a heat-resistant polycarbonate, a slip agent, and a particulate crosslinked polymethylsilsesquioxane having a specific particle size.

Thus, one embodiment is a film extrusion composition comprising, based on the total weight of the film extrusion composition: 50 to 99.35 weight percent of a copolycarbonate comprising, based on 100 mole percent total carbonate units in the copolycarbonate, 20 to 60 mole percent of first carbonate units having the structure

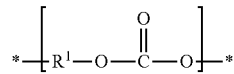

wherein $R^1$ is a $C_6$-$C_{16}$ divalent aromatic group; 40 to 80 mole percent of second carbonate units having the structure

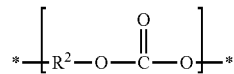

wherein $R^2$ is a $C_{17}$-$C_{40}$ divalent aromatic group having the structure

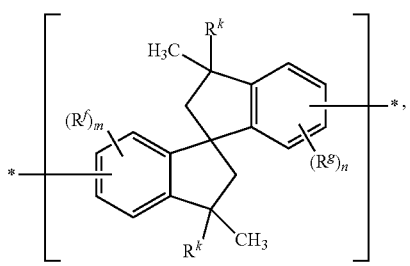

-continued

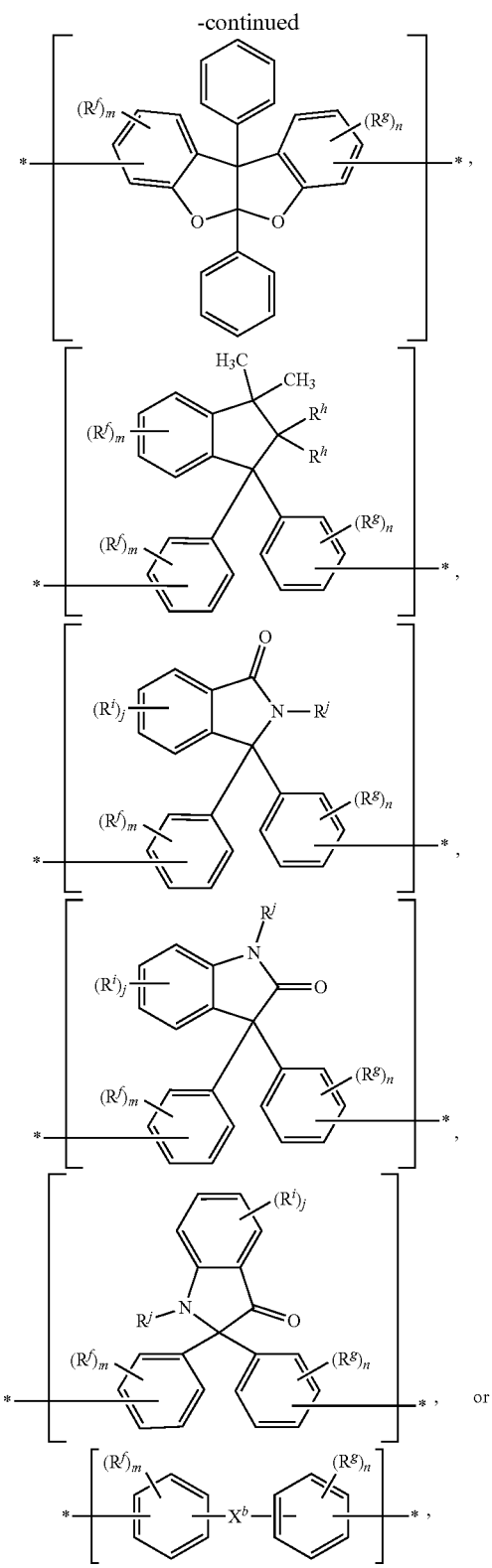

wherein $R^f$ and $R^g$ are each independently at each occurrence $C_1$-$C_{12}$ alkyl, $C_1$-$C_{12}$ alkoxyl, or $C_2$-$C_{12}$ alkenyl; each $R^h$ is hydrogen or two occurrence of $R^h$ combine with the carbon atom to which they are attached to form a carbonyl group; each occurrence of $R^i$ is independently $C_1$-$C_6$ alkyl; $R^j$ is hydrogen, $C_1$-$C_6$ alkyl, or phenyl optionally substituted with 1, 2, 3, 4, or 5 $C_1$-$C_6$ alkyl groups; $R^k$ is independently at each occurrence $C_1$-$C_3$ alkyl or phenyl, preferably methyl; $X^b$ is $C_6$-$C_{12}$ arylene, $C_4$-$C_{18}$ cycloalkylene, $C_4$-$C_{18}$ cycloalkylidene, or —C($R^m$)($R_n$)— wherein $R^m$ is hydrogen, $C_1$-$C_{12}$ alkyl, or $C_6$-$C_{12}$ aryl, and $R^n$ is $C_6$-$C_{10}$ alkyl, $C_6$-$C_8$ cycloalkyl, or $C_6$-$C_{12}$ aryl, or $X^b$ is -($Q^a$)$_x$G-($Q^b$)$_y$-, wherein $Q^a$ and $Q^b$ are each independently $C_1$-$C_3$ alkylene, G is $C_3$-$C_{10}$ cycloalkylene, x is zero or 1, and y is zero or 1; and j, m, and n are each independently zero, 1, 2, 3, or 4; and 0 mole percent of third carbonate units, each third carbonate unit comprising a divalent carbonate group and a divalent polysiloxane group, the divalent polysiloxane group comprising 5 to 60 diorganosiloxane units having the structure

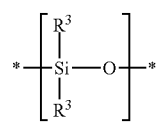

wherein each occurrence of $R^3$ is independently a $C_1$-$C_{13}$ hydrocarbyl group; 0.1 to 6 weight percent of a slip agent selected from the group consisting of pentaerythritol tetrastearate, dipentaerythritol hexastearate, glycerol tristearate, high density polyethylenes, polymethylpentenes, poly(carbonate-siloxane)s, and combinations thereof, and 0.55 to 0.8 weight percent of a particulate crosslinked polymethylsilsesquioxane having a number-based mean equivalent spherical diameter of 0.5 to 4 micrometers determined by electrical sensing zone method according to ISO 13319-1: 2021.

The film extrusion composition comprises a copolycarbonate. The copolycarbonate comprises first carbonate units, second carbonate units, and, optionally, third carbonate units. The first carbonate units have the structure

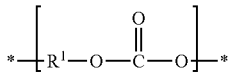

wherein $R^1$ is a $C_6$-$C_{16}$ divalent aromatic group. In some embodiments, a homopolymer of the first carbonate units has a glass transition temperature of 135° C. to less than 155° C., determined by differential scanning calorimetry according to ASTM D3418-15 at a heating rate of 20° C./minute.

In some embodiments, the first carbonate units have the structure

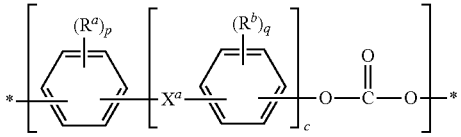

wherein $R^a$ and $R^b$ are each independently halogen (i.e., F, Cl, Br, or I), $C_1$-$C_3$ alkyl, or $C_1$-$C_3$ alkoxyl; c is zero or 1; p and q are each independently zero or 1; and $X^a$ is a single bond, —O—, —S—, —S(O)—, —S(O)$_2$—, —C(O)—, or a $C_1$-$C_4$ divalent hydrocarbylene group, which can be cyclic or acyclic, aromatic or non-aromatic, and can further comprise one or more heteroatoms selected from halogens, oxygen, nitrogen, sulfur, silicon, and phosphorus. As used herein, the term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it can contain heteroatoms in addition to carbon and hydrogen. In some embodiments, c is zero. In other embodiments, c is 1. In some embodiments, c is 1; and $X^a$ is selected from $C_3$-$C_6$ cycloalkylene (e.g., 1,4-cyclohexylene), $C_3$-$C_6$ cycloalkylidene (e.g., cyclohexylidene), $C_1$-$C_6$ alkylidene of the formula —C($R^e$)($R^d$)— wherein $R^e$ and $R^d$ are each independently hydrogen, $C_1$-$C_5$ alkyl, or a group of the formula —C(=$R^e$)— wherein $R^e$ is a divalent $C_1$-$C_5$ hydrocarbon group. $X^a$ and each terminal bond of the first carbonate unit can be disposed ortho, meta, or para (preferably para) to each other. In some embodiments, p and q are each zero. In some embodiments, c is 1; p and q are each 1; and $R^a$ and $R^b$ are each methyl, disposed meta to $X^a$. Some illustrative examples of dihydroxy compounds that can be used to form first carbonate units are described in U.S. Patent Application Publication Number US 2014/0295363 A1 of Sun et al., and International Patent Application Publication Numbers WO 2013/175448 A1 of Chen et al., and WO 2014/072923 A1 of Fernandez et al.

In some embodiments, the first carbonate unit is derived from bisphenol A, has the structure

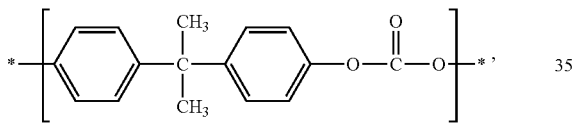

and is referred to as a bisphenol A carbonate unit.

The copolycarbonate comprises the first carbonate units in an amount of 20 to 60 mole percent, based on 100 mole percent total carbonate units in the copolycarbonate. Within this range, the amount of first carbonate units can be 25 to 55 mole percent, or 30 to 50 mole percent.

In addition to the first carbonate units, the copolycarbonate comprises second carbonate units having the structure

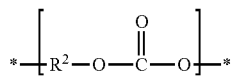

wherein $R^2$ is a $C_{17}$-$C_{40}$ divalent aromatic group having the structure

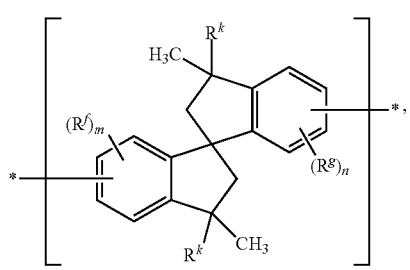

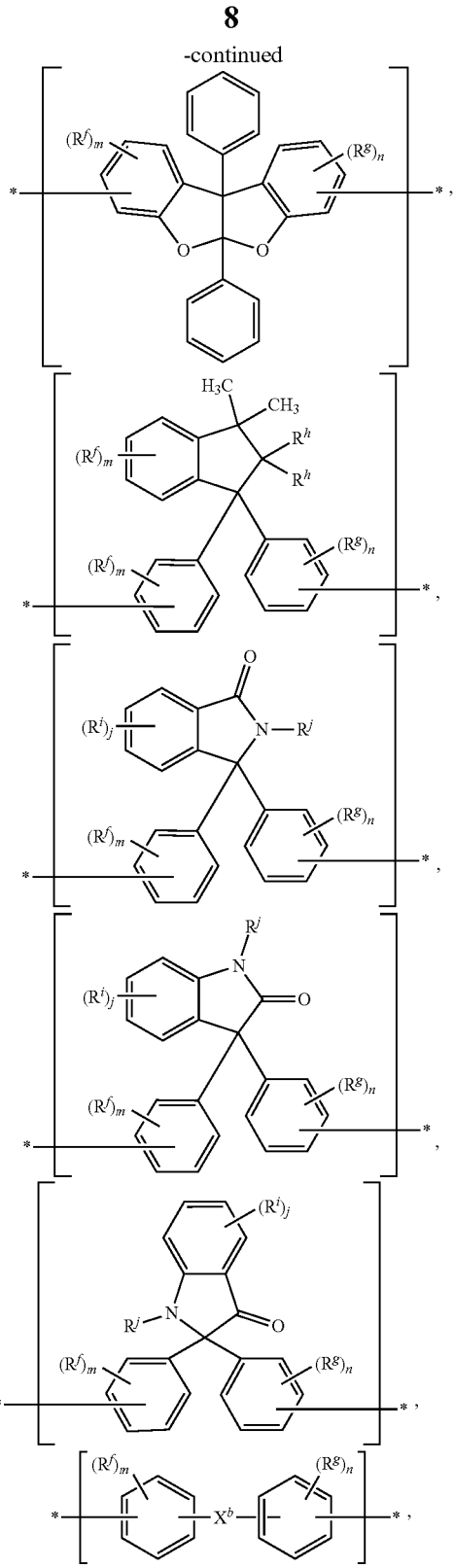

wherein $R^f$ and $R^g$ are each independently at each occurrence $C_1$-$C_{12}$ alkyl, $C_1$-$C_{12}$ alkoxyl, or $C_2$-$C_{12}$ alkenyl; each $R^h$ is hydrogen or two occurrence of $R^h$ combine with the carbon atom to which they are attached to form a carbonyl group; each occurrence of $R^i$ is independently $C_1$-$C_6$ alkyl; $R^j$ is hydrogen, $C_1$-$C_6$ alkyl, or phenyl optionally substituted with 1, 2, 3, 4, or 5 $C_1$-$C_6$ alkyl groups; $R^k$ is independently at each occurrence $C_1$-$C_3$ alkyl or phenyl, preferably methyl; $X^b$ is $C_6$-$C_{12}$ arylene, $C_4$-$C_{18}$ cycloalkylene, $C_4$-$C_{18}$ cycloalkylidene, or —C($R^m$)($R^n$)— wherein $R^m$ is hydrogen, $C_1$-$C_{12}$ alkyl, or $C_6$-$C_{12}$ aryl, and $R^n$ is $C_6$-$C_{10}$ alkyl, $C_6$-$C_8$ cycloalkyl, or $C_6$-$C_{12}$ aryl, or $X^b$ is -$(Q^a)_x$-G-$(Q^b)_y$-, wherein $Q^a$ and $Q^b$ are each independently $C_1$-$C_3$ alkylene, G is $C_3$-$C_{10}$ cycloalkylene, x is zero or 1, and y is zero or 1; and j, m, and n are each independently zero, 1, 2, 3, or 4. In some embodiments, a homopolymer of the second carbonate units has a glass transition temperature of 155° C. or higher, or 155 to 300° C., determined by differential scanning calorimetry according to ASTM D3418-15 at a heating rate of 20° C./minute.

Exemplary second carbonate units include those having the structures

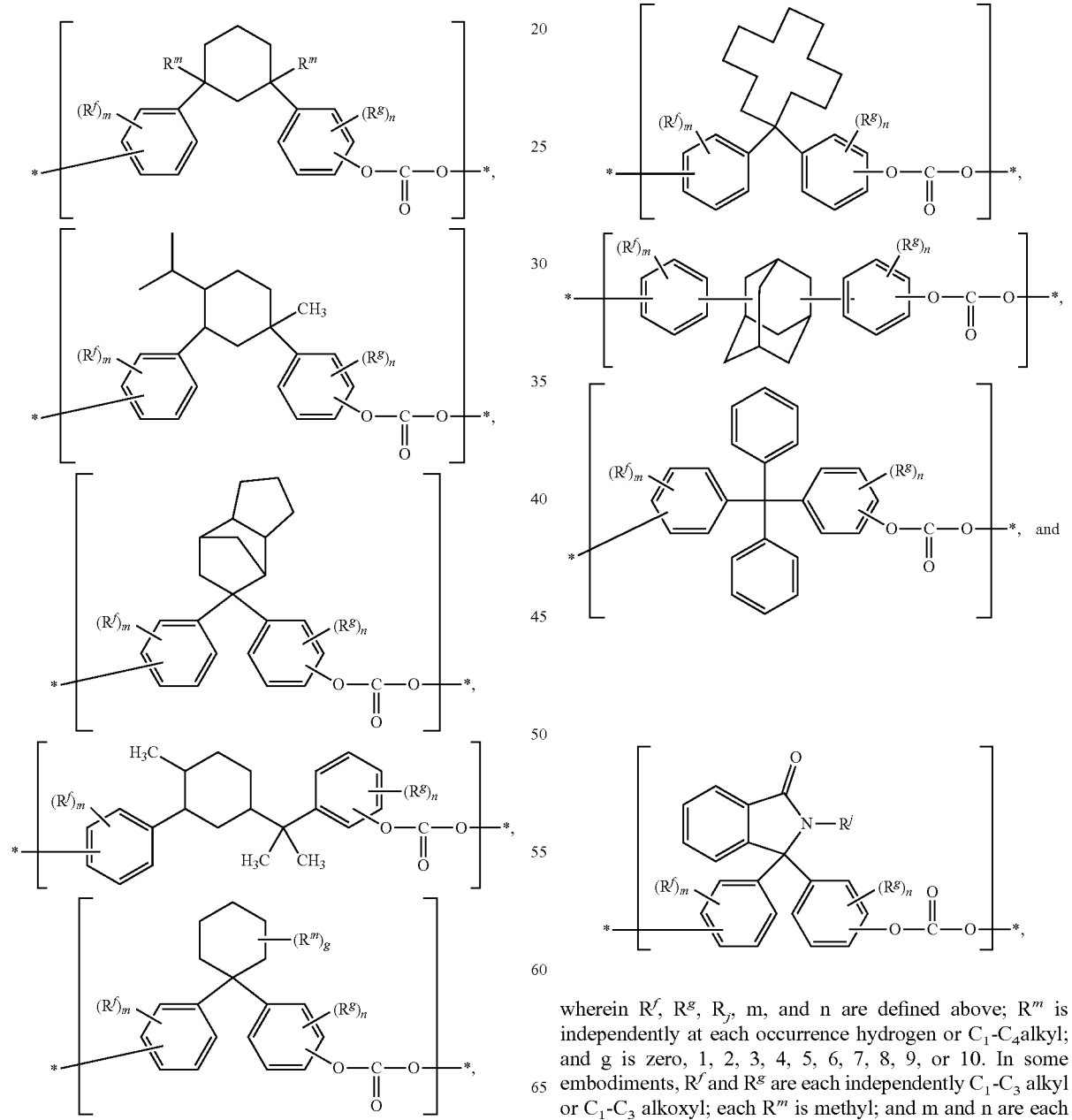

wherein $R^f$, $R^g$, $R_j$, m, and n are defined above; $R^m$ is independently at each occurrence hydrogen or $C_1$-$C_4$alkyl; and g is zero, 1, 2, 3, 4, 5, 6, 7, 8, 9, or 10. In some embodiments, $R^f$ and $R^g$ are each independently $C_1$-$C_3$ alkyl or $C_1$-$C_3$ alkoxyl; each $R^m$ is methyl; and m and n are each independently zero or 1.

In some embodiments, the second carbonate units have the structure

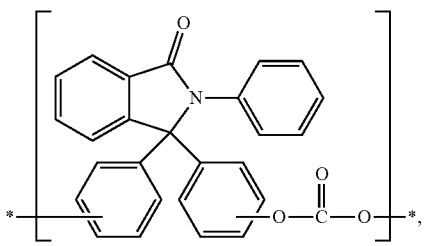

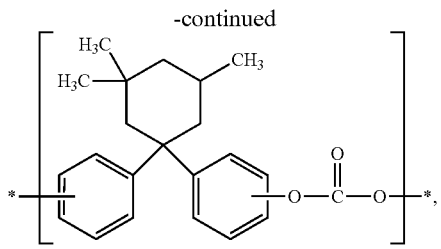

or a combination thereof, where the first structure above is referred to as 2-phenyl-3,3'-bis(4-hydroxyphenyl)phthalimidine carbonate or PPPBP carbonate, and the second structure above is referred to as bisphenol isophorone carbonate or BPI carbonate. In some embodiments, the second carbonate units comprise bisphenol isophorone carbonate units.

The copolycarbonate comprises the second carbonate units in an amount of 40 to 80 mole percent, based on 100 mole percent total carbonate units in the copolycarbonate. Within this range, the amount of second carbonate units can be 45 to 75 mole percent, or 50 to 70 mole percent.

In addition to the first carbonate units and the second carbonate units, the copolycarbonate can, optionally, further comprise third carbonate units, each third carbonate unit comprising a divalent carbonate group (—OC(O)O—) and a divalent polysiloxane group, the divalent polysiloxane group comprising 5 to 60 diorganosiloxane units having the structure

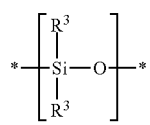

wherein each occurrence of $R^3$ is independently a $C_1$-$C_{13}$ hydrocarbyl group. The $C_1$-$C_{14}$ hydrocarbyl group can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. Examples of $R^3$ groups include $C_1$-$C_{14}$ alkyl, $C_1$-$C_{14}$ alkoxyl, $C_2$-$C_{14}$ alkenyl, $C_2$-$C_{14}$ alkenyloxyl, $C_6$-$C_{14}$ aryl, $C_6$-$C_{14}$ aryloxyl, $C_7$-$C_{14}$ arylalkyl, and $C_6$-$C_{14}$ alkylaryl. In some embodiments, each occurrence of $R^3$ is methyl.

Each of the third carbonate units comprises 5 to 60 diorganosiloxane units. Within this range, the number of diorganosiloxane units can be 10 to 60, or 20 to 60, or 30 to 60, or 35 to 55.

In some embodiments, the third carbonate units have the structure,

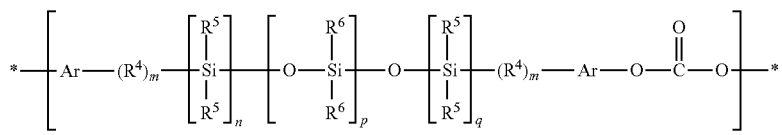

wherein Ar is independently at each occurrence a $C_6$-$C_{24}$ aromatic divalent group optionally substituted with 1, 2, 3, or 4 substituents, each substituent independently selected from the group consisting of halogen (i.e., F, Cl, Br, or I), $C_1$-$C_6$ alkyl, and $C_1$-$C_6$ alkoxyl; $R^4$ is independently at each occurrence a $C_2$-$C_8$ divalent aliphatic group; R and $R^6$ are independently at each occurrence $C_1$-$C_{12}$ alkyl or $C_6$-$C_{18}$ aryl; m and n and q are independently at each occurrence zero or 1; and p is (30-n-q) to (60-n-q), or (35-n-q) to (55-n-q).

Examples of Ar groups include 1,3-phenylene, 1,4-phenylene, and 2,2-bis(4-phenylenyl)propane. When each occurrence of m, n, and q is zero, each occurrence of Ar can be derived from a $C_6$-$C_{24}$ dihydroxyarylene compound, such as, for example, resorcinol, 1,1-bis(4-hydroxyphenyl)methane, 1,1-bis(4-hydroxyphenyl)ethane, 1,1-bis(4-hydroxyphenyl)propane, 2,2-bis(4-hydroxyphenyl)propane, 1,1-bis(4-hydroxyphenyl)butane, 2,2-bis(4-hydroxyphenyl)butane, 2,2-bis(4-hydroxyphenyl)octane, 2,2-bis(4-hydroxy-3-methylphenyl)propane, 1,1-bis(4-hydroxyphenyl)cyclohexane, bis(4-hydroxyphenyl)sulfide, 2,2-bis(3,5-dibromo-4-hydroxyphenyl)propane, and 1,1-bis(4-hydroxy-3-t-butylphenyl)propane.

Examples of $R^4$ groups include, for example, dimethylene (—$(CH_2)_2$—), trimethylene (—$(CH_2)_3$—), hexamethylene (—$(CH_2)_6$—), and 1,4-cyclohexylene. In some embodiments, each occurrence of $R^4$ is trimethylene.

Examples of R and $R^6$ groups include, for example, methyl, ethyl, 1-propyl, cyclohexyl, and phenyl. In some embodiments, each occurrence of $R^5$ and $R^6$ is methyl.

In some embodiments, each occurrence of m and n and q is zero. In other embodiments, each occurrence of m and n and q is 1. In some embodiments, p is (35-n-q) to (55-n-q).

In some embodiments, the third carbonate units have the structure,

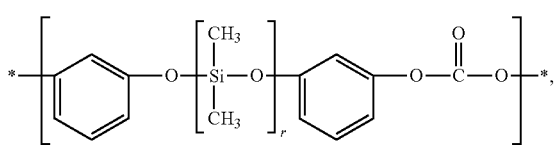

wherein r is 5 to 60, or 5 to 60, or 10 to 60, or 20 to 60, or 30 to 60, or 35 to 55.

In other embodiments, the third carbonate units have the structure,

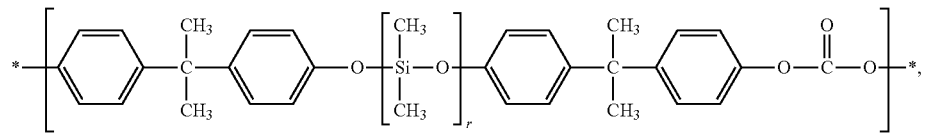

wherein r is 5 to 60, or 5 to 60, or 10 to 60, or 20 to 60, or 30 to 60, or 35 to 55.

In still other embodiments, the third carbonate units have the structure,

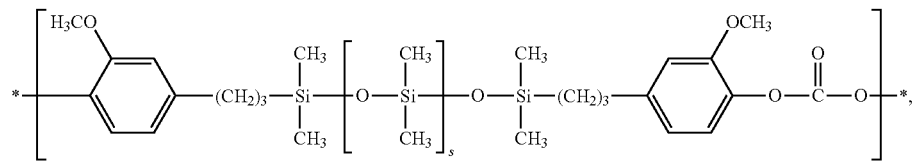

wherein s is 3 to 58, or 8 to 58, or 18 to 58, or 28 to 58, or 33 to 53. When s is 43, the structure is referred to as D45 carbonate.

The copolycarbonate comprises 0 mole percent of (i.e., is free of) the third carbonate units, based on 100 mole percent total carbonate units in the copolycarbonate.

In a very specific embodiment of the polycarbonate-polysiloxane, the first carbonate units have the structure

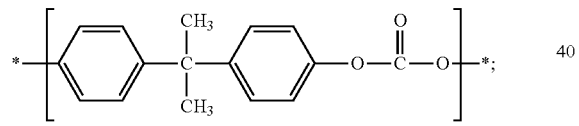

the second carbonate units have the structure

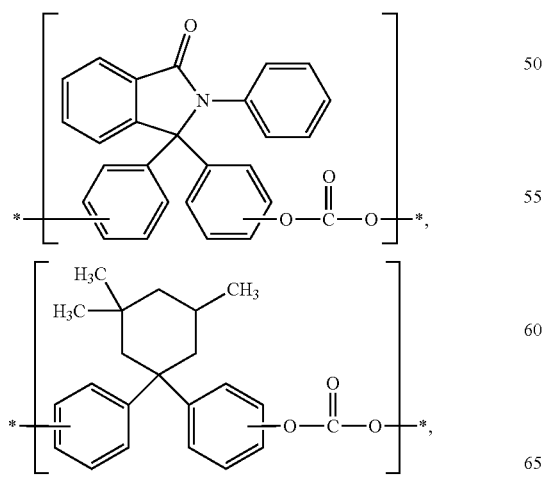

or a combination thereof; and the third carbonate units, if present, have the structure

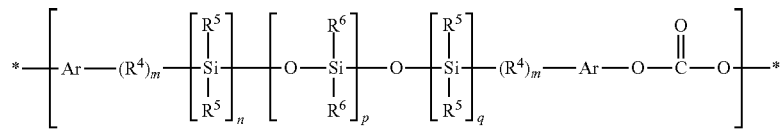

wherein Ar is independently at each occurrence a $C_6$-$C_{24}$ aromatic divalent group optionally substituted with 1, 2, 3, or 4 substituents, each substituent independently selected from the group consisting of halogen, $C_1$-$C_6$ alkyl, and $C_1$-$C_6$ alkoxyl; $R^4$ is independently at each occurrence a $C_2$-$C_8$ divalent aliphatic group; $R^5$ and $R^6$ are independently at each occurrence $C_1$-$C_{12}$ alkyl or $C_6$-$C_{18}$ aryl; m and n and q are independently at each occurrence zero or 1; and p is (30-n-q) to (60-n-q), or (35-n-q) to (55-n-q).

In some embodiments, the copolycarbonate has a weight average molecular weight of 10,000 to 50,000 grams/mole, as determined by gel permeation chromatography using bisphenol A polycarbonate standards. Within this range, the weight average molecular weight can be 15,000 to 40,000 grams/mole, or 20,000 to 30,000 grams/mole.

The copolycarbonate can be prepared using known methods, including those described in, for example, U.S. Pat. Nos. 3,419,634 and 3,419,635 to Vaughn, U.S. Pat. No. 3,821,325 to Merritt et al., U.S. Pat. No. 3,832,419 to Merritt, and U.S. Pat. No. 6,072,011 to Hoover.

The film extrusion composition comprises 50 to 99.35 weight percent of the copolycarbonate, based on the total weight of the film extrusion composition. Within this range, the amount of copolycarbonate can be 70 to 99.35 weight percent, or 90 to 99.35 weight percent, or 95 to 99.35 weight percent.

In addition to the copolycarbonate, the film extrusion composition comprises a slip agent. Suitable slip agents include, for example, pentaerythritol tetrastearate, dipentaerythritol hexastearate, glycerol tristearate, high density polyethylenes, polymethylpentenes, poly(carbonate-siloxane)s (including poly(carbonate-siloxane) block copolymers), and combinations thereof. In some embodiments, the slip agent is selected from the group consisting of pentaerythritol tetrastearate; a poly(carbonate-siloxane) block copolymer comprising, based on the weight of the poly(carbonate-siloxane) block copolymer, 70 to 90 weight percent of bisphenol A carbonate units and 10 to 30 weight percent of dimethylsiloxane units, based on the weight of the poly(carbonate-siloxane) block copolymer; and a combination of pentaerythritol tetrastearate and the poly(carbonate-siloxane) block copolymer. The film extrusion composition comprises the slip agent in an amount of 0.1 to 6 weight percent, based on the total weight of the film extrusion composition. Within this range, the slip agent amount can be 0.1 to 5 weight percent, or 0.1 to 4 weight percent, or 0.1 to 3 weight percent, or 0.1 to 2 weight percent, or 0.1 to 1 weight percent, or 0.1 to 0.6 weight percent.

In addition to the copolycarbonate and the slip agent, the film extrusion composition comprises a particulate crosslinked polymethylsilsesquioxane. Particulate crosslinked polymethylsilsesquioxanes are commercially available, for example under the trade name TOSPEARL™ microspheres from Momentive Performance Chemicals. Crosslinked polymethylsilsesquioxanes such as TOSPEARL™ microspheres are spherical and have a pliable, gel-like consistency, making them amenable to processing using fine filters. For example, when the film extrusion composition is passed through a melt filter (e.g., a 5 micrometer filter), the roughening agent does not clog the filter, thereby avoiding the problems encountered when inorganic fine particles are used as roughening agents.

The particulate crosslinked polymethylsilsesquioxane has a number-based mean equivalent spherical diameter (also known as Heywood diameter) of 0.5 to 4 micrometers, determined by electrical sensing zone method according to ISO 13319-1:2021. Within the range of 0.5 to 4 micrometers, the number-based mean equivalent spherical diameter can be 0.5 to 3.5 micrometers, or 1 to 3.5 micrometers, or 1 to 3 micrometers.

The film extrusion composition comprises the particulate crosslinked polymethylsilsesquioxane in an amount of 0.55 to 0.8 weight percent, based on the total weight of the film extrusion composition. Within this range, the particulate crosslinked polymethylsilsesquioxane amount can be 0.55 to 0.75 weight percent, or 0.55 to 0.7 weight percent, or 0.6 to 0.8 weight percent, or 0.6 to 0.75 weight percent, or 0.6 to 0.7 weight percent.

In some embodiments, the particulate crosslinked polymethylsilsesquioxane comprises, based on the total weight of the film extrusion composition, 0.55 to 0.7 weight percent of particles having a number-based mean equivalent spherical diameter of 1.5 to 2.5 micrometers. The particulate crosslinked polymethylsilsesquioxane can comprise two or more different particle sizes. For example, in some embodiments, the particulate crosslinked polymethylsilsesquioxane comprises, based on the total weight of the film extrusion composition, 0.2 to 0.6 weight percent of first particles having a number-based mean equivalent spherical diameter of 0.5 to 1 micrometers, and 0.2 to 0.6 weight percent of second particles having a number-based mean equivalent spherical diameter of 1.5 to 3 micrometers. In other embodiments, the particulate crosslinked polymethylsilsesquioxane comprises, based on the total weight of the film extrusion composition, 0.2 to 0.6 weight percent of first particles having a number-based mean equivalent spherical diameter of 1.5 to 2.4 micrometers, and 0.2 to 0.6 weight percent of second particles having a number-based mean equivalent spherical diameter of 2.5 to 4 micrometers.

The film extrusion composition can, optionally, include up to 49.35 weight percent of bisphenol A polycarbonate, based on the total weight of the film extrusion composition. In some embodiments, the film extrusion composition comprises bisphenol A polycarbonate in an amount of 1 to 49.35 weight percent, or 1 to 30 weight percent, or 1 to 20 weight percent, or 1 to 10 weight percent. In some embodiments, the film extrusion composition excludes bisphenol A polycarbonate.

The film extrusion composition can, optionally, include one or more additives known in the thermoplastics art. Additives include, for example, stabilizers, lubricants (other than the slip agents described above), processing aids, drip retardants, nucleating agents, ultraviolet light absorbers, colorants (including dyes and pigments), antioxidants, antistatic agents, metal deactivators, and combinations thereof. When present, such additives are typically used in a total amount of less than or equal to 10 weight percent, or less than or equal to 5 weight percent, or less than or equal to 1 weight percent, or less than or equal to 0.1 weight percent, based on the total weight of the composition.

In a very specific embodiment of the film extrusion composition, the composition comprises 90 to 99.25 weight percent of the copolycarbonate, 0.2 to 5 weight percent of the slip agent, and 0.55 to 0.7 weight percent of the particulate crosslinked polymethylsilsesquioxane; and the copolycarbonate comprises 50 to 75 mole percent of 3,3,5-trimethylcyclohexanonebisphenol carbonate units, and 25 to 50 mole percent of bisphenol A carbonate units. In some variations of the very specific embodiment of the film extrusion composition, the slip agent is selected from the group consisting of pentaerythritol tetrastearate; a poly(carbonate-siloxane) block copolymer comprising, based on the weight of the poly(carbonate-siloxane) block copolymer, 70 to 90 weight percent of bisphenol A carbonate units and 10 to 30 weight percent of dimethylsiloxane units, based on the weight of the poly(carbonate-siloxane) block copolymer; and a combination of pentaerythritol tetrastearate and the poly(carbonate-siloxane) block copolymer. In some variations of the very specific embodiment of the film extrusion composition, the particulate crosslinked polymethylsilsesquioxane comprises, based on the total weight of the film extrusion composition, 0.55 to 0.7 weight percent of particles having a number-based mean equivalent spherical diameter of 1.5 to 2.5 micrometers.

In some embodiments of the film extrusion composition, a ratio, $t_p60$/(total number of particles), is 0.1 to 0.5 percent, wherein $t_p60$ is the load/length ratio at 60 percent, expressed in units of percent, calculated according to JIS B0601(1994) using the formula $$t_p60 = ((L_1 + L_2 + L_3 + \ldots L_n)/L) \times 100$$

wherein $(L_1+L_2+L_3+ \ldots L_n)$ is the sum of cut portion lengths measured along a measurement length, L, at a cut line level of 60% of the separation between the highest peak height (corresponding to 0%) and the lowest trough bottom (corresponding to 100%); and wherein the total number of particles is the number of the crosslinked polymethylsilsesquioxane particles in one nanogram of extruded film, calculated from the weight of crosslinked polymethylsilsesquioxane particles in one nanogram of film extrusion composition, the density of the particles, and the number-based mean equivalent spherical diameter of the particles according to the formula total #particles =

$$[(1 \times 10^{-9} \text{ g})(\text{wt. fraction } PMSS)/(PMSS \text{ density in g}/\mu m^3)]/(\text{volume of 1 particle in } \mu m^3)$$

wherein "total #particles" is the number of the crosslinked polymethylsilsesquioxane particles in one nanogram of extruded film; "$1 \times 10^{-9}$ g" is $1 \times 10^{-9}$ grams; "wt. fraction PMSS" is the weight fraction of crosslinked polymethylsilsesquioxane particles in the film extrusion composition; "PMSS density in g/$\mu m^3$" is the density of the crosslinked polymethylsilsesquioxane particles in units of grams/micrometer$^3$; and "volume of 1 particle in $\mu m^3$" is the volume of a single crosslinked polymethylsilsesquioxane particle, in units of micrometers$^3$, calculated as $(4/3)\pi(d/2)^3$ where d is the number-based mean equivalent spherical diameter of the crosslinked polymethylsilsesquioxane particles. Within the range of 0.1 to 0.5 percent, the ratio, $t_p60$/(total number of particles), can be 0.2 to 0.4 percent, or 0.25 to 0.35 percent.

Surface roughness characteristics used in the calculation of $t_p60$, which is the load/length ratio at 60 percent, are illustrated in the FIGURE, where 1 is the measurement length, L, over which the surface profile, 2, is determined; 3 is the highest peak in the surface profile; 4 is a horizontal line intersecting the highest peak and corresponding to a cut-line level of 0%; 5 is the lowest trough in the surface profile; 6 is a horizontal line intersecting the lowest trough and corresponding to a cut-line level of 100%; 7 is a cut-line level of 27%; 8 is the cut portion length, $L_1$, of the first peak protruding above the cut-line level of 27%; 9 is the cut portion length, $L_2$, of the second peak protruding above the cut-line level of 27%; 10 is the cut portion length, $L_3$, of the third peak protruding above the cut-line level of 27%; and 11 is the cut portion length, $L_n$, of the last peak protruding above the cut-line level of 27%. The parameter $t_p27$ is calculated according to the formula $$t_p27 = ((L_1 + L_2 + L_3 + \ldots L_n)/L) \times 100$$

wherein $(L_1+L_2+L_3+ \ldots L_n)$ is the sum of all the cut portion lengths along the measurement length at a cut-line level of 27%, and L is the measurement length. The parameter $t_p60$ is similarly calculated, except that the cut-line level is at 60% rather than 27%. In general, the value of L is chosen to be much greater that the individual values of $L_1$, $L_2$, $L_3$, . . . $L_n$. In the working examples below, an L value of 0.71 millimeter was used. In some embodiments, L has a value of 0.2 to 5 millimeters.

The film extrusion composition can be prepared by melt blending the components of the composition. Illustrative melt blending equipment and conditions are described in the working examples below. In some embodiments, melt-blending is conducted in a single-screw or twin-screw extruder, and all components are added at the feed throat of the extruder. In some embodiments, the slip agent comprises a poly(carbonate-siloxane) block copolymer, and the poly(carbonate-siloxane) block copolymer and the particulate crosslinked polymethylsilsesquioxane are pre-blended to form a masterbatch, which is then added to the feed throat of the extruder with the remaining components. In other embodiments, a portion of the copolycarbonate and the particulate crosslinked polymethylsilsesquioxane are pre-blended to form a masterbatch, which is then added to the feed throat of the extruder with the remaining components.

Another embodiment is an extruded film comprising the film extrusion composition in any of its above-described variations. The composition can be extruded using extruders conventionally used for thermoplastic compositions using a flat die. An extrusion cast film method can include melting the composition in an extruder, conveying the molten composition through a flat die of small lip gap separation, optionally stretching of the film using relatively high take-up speeds, and cooling/solidifying the film-forming composition to form the final film. The extruder can be of the single- or twin-screw design, and a melt pump can be used to provide a constant, non-pulsating flow of polymer through the die. The die lip gap can be as small as 100-200 micrometers, and the take-up rollers can operate at speeds of up to 200 meters/minute. The design can include the addition of a heated roll to temper/anneal the film and thus minimize the occurrence of frozen-in internal stresses. The edges of the film can be trimmed, and the film wound up on a roll using a tension-controlled winding mechanism. The accuracy of delivering a constant and uniform flow of molten polymer through the die, the rheological properties of the polymer used to make the film, the cleanliness of both polymer and equipment, and the mechanical characteristics of the take-up mechanism will all contribute to the successful preparation of extruded films of relatively small thicknesses. In some embodiments, the film thickness is 2 to 15 micrometers, or 2 to 10 micrometers, or 2 to 8 micrometers, or 2 to 6 micrometers.

In a very specific embodiment of the extruded film, the film extrusion composition comprises 90 to 99.25 weight percent of the copolycarbonate, 0.2 to 5 weight percent of the slip agent, and 0.55 to 0.7 weight percent of the particulate crosslinked polymethylsilsesquioxane; and the copolycarbonate comprises 50 to 75 mole percent of 3,3,5-trimethylcyclohexanonebisphenol carbonate units, and 25 to 50 mole percent of bisphenol A carbonate units. In some variations of the very specific embodiment of the extruded film, the slip agent is selected from the group consisting of pentaerythritol tetrastearate; a poly(carbonate-siloxane) block copolymer comprising, based on the weight of the poly(carbonate-siloxane) block copolymer, 70 to 90 weight percent of bisphenol A carbonate units and 10 to 30 weight percent of dimethylsiloxane units, based on the weight of the poly(carbonate-siloxane) block copolymer; and a combination of pentaerythritol tetrastearate and the poly(carbonate-siloxane) block copolymer. In some variations of the very specific embodiment of the extruded film, the particulate crosslinked polymethylsilsesquioxane comprises, based on the total weight of the film extrusion composition, 0.55 to 0.7 weight percent of particles having a number-based mean equivalent spherical diameter of 1.5 to 2.5 micrometers.

Another embodiment is a metallized film (e.g., a film capacitor) comprising: an extruded film comprising the film extrusion composition in any of its above-described variations; and an electrically conductive metal layer in contact with the extruded film. A variety of metals and metal alloys can be used for the electrically conductive metal layer, depending on the intended use of the film. In some embodiments, the electrically conductive metal layer comprises a metal selected from the group consisting of copper, aluminum, silver, gold, nickel, zinc, titanium, chromium, vanadium, platinum, tantalum, niobium, brass, and combinations thereof. Methods for the metallization of polymer films are known, and include, for example, vacuum metal vapor deposition, metal sputtering, plasma treatments, electron beam treatments, chemical oxidation, or reduction reactions, as well as electroless wet-chemical deposition. The extruded film can be metallized on both sides by conventional electroless plating. Alternatively, a patterned metal layer can be formed on a surface of the film, for example by ink jet printing. The thickness of the electrically conductive metal layer is determined by the intended use of the metallized film, and can be, for example, 0.1 to 1000 nanometers, or 0.5 to 500 nanometers, or 1 to 10 nanometers.

The invention includes at least the following aspects.

Aspect 1: A film extrusion composition comprising, based on the total weight of the film extrusion composition: 50 to 99.35 weight percent of a copolycarbonate comprising, based on 100 mole percent total carbonate units in the copolycarbonate, 20 to 60 mole percent of first carbonate units having the structure

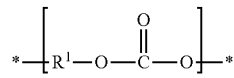

wherein $R^1$ is a $C_6$-$C_{16}$ divalent aromatic group; 40 to 80 mole percent of second carbonate units having the structure

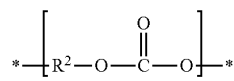

wherein $R^2$ is a $C_{17}$-$C_{40}$ divalent aromatic group having the structure

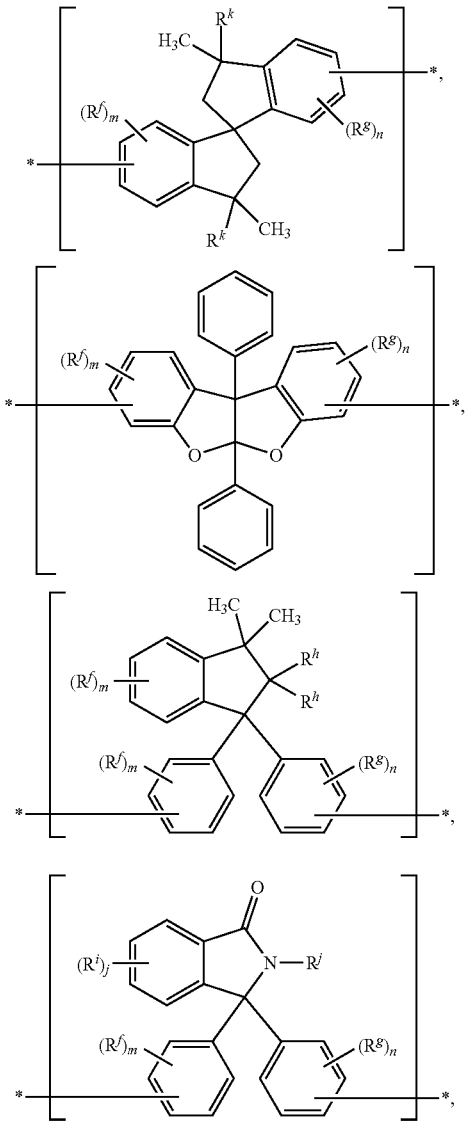

-continued

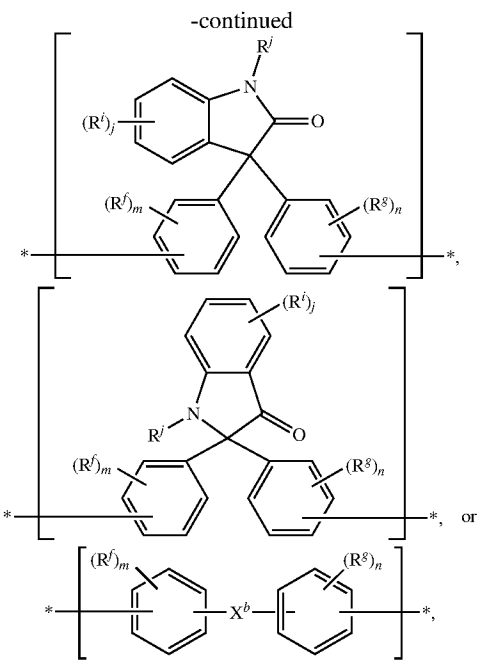

wherein $R^f$ and $R^g$ are each independently at each occurrence $C_1$-$C_{12}$ alkyl, $C_1$-$C_{12}$ alkoxyl, or $C_2$-$C_{12}$ alkenyl; each $R^h$ is hydrogen or two occurrence of $R^h$ combine with the carbon atom to which they are attached to form a carbonyl group; each occurrence of $R^i$ is independently $C_1$-$C_6$ alkyl; $R^j$ is hydrogen, $C_1$-$C_6$ alkyl, or phenyl optionally substituted with 1, 2, 3, 4, or 5 $C_1$-$C_6$ alkyl groups; $R^k$ is independently at each occurrence $C_1$-$C_3$ alkyl or phenyl, preferably methyl; $X^b$ is $C_6$-$C_{12}$ arylene, $C_4$-$C_{18}$ cycloalkylene, $C_4$-$C_{18}$ cycloalkylidene, or —C($R^m$)($R^n$)— wherein $R^m$ is hydrogen, $C_1$-$C_{12}$ alkyl, or $C_6$-$C_{12}$ aryl, and $R^n$ is $C_6$-$C_{10}$ alkyl, $C_6$-$C_8$ cycloalkyl, or $C_6$-$C_{12}$ aryl, or $X^b$ is -$(Q^a)_x$-G-$(Q^b)_y$-, wherein $Q^a$ and $Q^b$ are each independently $C_1$-$C_3$ alkylene, G is $C_3$-$C_{10}$ cycloalkylene, x is zero or 1, and y is zero or 1; and j, m, and n are each independently zero, 1, 2, 3, or 4; and 0 mole percent of third carbonate units, each third carbonate unit comprising a divalent carbonate group and a divalent polysiloxane group, the divalent polysiloxane group comprising 5 to 60 diorganosiloxane units having the structure

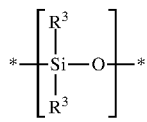

wherein each occurrence of $R^3$ is independently a $C_1$-$C_{13}$ hydrocarbyl group; 0.1 to 6 weight percent of a slip agent selected from the group consisting of pentaerythritol tetrastearate, dipentaerythritol hexastearate, glycerol tristearate, high density polyethylenes, polymethylpentenes, poly(carbonate-siloxane)s, and combinations thereof, and 0.55 to 0.8 weight percent of a particulate crosslinked polymethylsilsesquioxane having a number-based mean equivalent spherical diameter of 0.5 to 4 micrometers determined by electrical sensing zone method according to ISO 13319-1: 2021.

Aspect 2: The film extrusion composition of aspect 1, wherein a ratio, $t_p60$/(total number of particles), is 0.1 to 0.5 percent, wherein $t_p60$ is the load/length ratio at 60 percent, expressed in units of percent, calculated according to JIS B0601(1994) using the formula $$t_p60 = ((L_1 + L_2 + L_3 + \ldots L_n)/L) \times 100$$

wherein ($L_1$+$L_2$+$L_3$+ . . . $L_n$) is the sum of cut portion lengths measured along a measurement length, L, at a cut line level of 60% of the separation between the highest peak height (corresponding to 0%) and the lowest trough bottom (corresponding to 100%); and wherein the total number of particles is the number of the crosslinked polymethylsilsesquioxane particles in one nanogram of extruded film, calculated from the weight of crosslinked polymethylsilsesquioxane particles in one nanogram of film extrusion composition, the density of the particles, and the number-based mean equivalent spherical diameter of the particles.

Aspect 3: The film extrusion composition of aspect 1 or 2, wherein the particulate crosslinked polymethylsilsesquioxane comprises, based on the total weight of the film extrusion composition, 0.55 to 0.7 weight percent of particles having a number-based mean equivalent spherical diameter of 1.5 to 2.5 micrometers.

Aspect 4: The film extrusion composition of aspect 1 or 2, wherein the particulate crosslinked polymethylsilsesquioxane comprises, based on the total weight of the film extrusion composition, 0.2 to 0.6 weight percent of first particles having a number-based mean equivalent spherical diameter of 0.5 to 1 micrometers, and 0.2 to 0.6 weight percent of second particles having a number-based mean equivalent spherical diameter of 1.5 to 3 micrometers.

Aspect 5: The film extrusion composition of aspect 1 or 2, wherein the particulate crosslinked polymethylsilsesquioxane comprises, based on the total weight of the film extrusion composition, 0.2 to 0.6 weight percent of first particles having a number-based mean equivalent spherical diameter of 1.5 to 2.4 micrometers, and 0.2 to 0.6 weight percent of second particles having a number-based mean equivalent spherical diameter of 2.5 to 4 micrometers.

Aspect 6: The film extrusion composition of any one of aspects 1 to 5, wherein the slip agent is selected from the group consisting of pentaerythritol tetrastearate; a poly(carbonate-siloxane) block copolymer comprising, based on the weight of the poly(carbonate-siloxane) block copolymer, 70 to 90 weight percent of bisphenol A carbonate units and 10 to 30 weight percent of dimethylsiloxane units, based on the weight of the poly(carbonate-siloxane) block copolymer; and a combination of pentaerythritol tetrastearate and the poly(carbonate-siloxane) block copolymer.

Aspect 7: The film extrusion composition of any one of aspects 1 to 6, wherein the film extrusion composition comprises 90 to 99.25 weight percent of the copolycarbonate, 0.2 to 5 weight percent of the slip agent, and 0.55 to 0.7 weight percent of the particulate crosslinked polymethylsilsesquioxane; and wherein the copolycarbonate comprises 50 to 75 mole percent of 3,3,5-trimethylcyclohexanonebisphenol carbonate units, and 25 to 50 mole percent of bisphenol A carbonate units.

Aspect 8: The film extrusion composition of aspect 7, wherein the particulate crosslinked polymethylsilsesquioxane comprises, based on the total weight of the film extrusion composition, 0.55 to 0.7 weight percent of particles having a number-based mean equivalent spherical diameter of 1.5 to 2.5 micrometers.

Aspect 9: An extruded film comprising the film extrusion composition of any one of aspects 1-8.

Aspect 10: The extruded film of aspect 9, wherein the film extrusion composition comprises 90 to 99.25 weight percent of the copolycarbonate, 0.2 to 5 weight percent of the slip agent, and 0.55 to 0.7 weight percent of the particulate crosslinked polymethylsilsesquioxane; and wherein the copolycarbonate comprises 50 to 75 mole percent of 3,3,5-trimethylcyclohexanonebisphenol carbonate units, and 25 to 50 mole percent of bisphenol A carbonate units.

Aspect 11: The extruded film of aspect 10, wherein the particulate crosslinked polymethylsilsesquioxane comprises, based on the total weight of the film extrusion composition, 0.55 to 0.7 weight percent of particles having a number-based mean equivalent spherical diameter of 1.5 to 2.5 micrometers.

Aspect 12: A capacitor comprising: an extruded film comprising the film extrusion composition of any one of aspects 1-8; and an electrically conductive metal layer in contact with the extruded film.

Aspect 13: The capacitor of aspect 12, wherein the film extrusion composition comprises 90 to 99.25 weight percent of the copolycarbonate, 0.2 to 5 weight percent of the slip agent, and 0.55 to 0.7 weight percent of the particulate crosslinked polymethylsilsesquioxane; and wherein the copolycarbonate comprises 50 to 75 mole percent of 3,3,5-trimethylcyclohexanonebisphenol carbonate units, and 25 to 50 mole percent of bisphenol A carbonate units.

Aspect 14: The capacitor of aspect 13, wherein the particulate crosslinked polymethylsilsesquioxane comprises, based on the total weight of the film extrusion composition, 0.55 to 0.7 weight percent of particles having a number-based mean equivalent spherical diameter of 1.5 to 2.5 micrometers.

Aspect 15: A metallized film comprising: an extruded film comprising the film extrusion composition of any one of aspects 1-8; and an electrically conductive metal layer in contact with the extruded film.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES

Materials used to form film extrusion compositions are summarized in Table 1.

TABLE 1

| Material | Description |
| --- | --- |
| HHPC 1 | A tert-butylphenol end-capped copolycarbonate containing 57 mole percent of 3,3,5-trimethylcyclohexanonebisphenol (BPI) carbonate units and 43 mole percent of bisphenol A (BPA) carbonate units, and having a weight average molecular weight of about 28,000 grams/mole determined by gel permeation chromatography with polystyrene standards. |
| HHPC 2 | A tert-butylphenol end-capped copolycarbonate containing 66 mole percent of 3,3,5-trimethylcyclohexanonebisphenol (BPI) carbonate units and 34 mole percent of bisphenol A (BPA) carbonate units, and having a weight average molecular weight of about 23,500 grams/mole determined by gel permeation chromatography with polystyrene standards. |
| PC-Si | A poly(carbonate-siloxane) block copolymers comprising about 80 weight percent of bisphenol A carbonate units and about 20 weight percent of dimethylsiloxane units, each polysiloxane block containing, on average, about 45 siloxane units, and the polycarbonate-polysiloxane block copolymer having a weight average molecular weight of about 30,000 grams/mole determined by gel permeation chromatography using bisphenol A polycarbonate standards. |
| PMSS 1 | Particulate crosslinked polymethylsilsequioxane having a number-based mean equivalent spherical diameter of 0.7 micrometers determined by the electrical sensing zone method according to ISO 13319-1: 2021. |
| PMSS 2 | Particulate crosslinked polymethylsilsequioxane having a number-based mean equivalent spherical diameter of 2.0 micrometers determined by the electrical sensing zone method according to ISO 13319-1: 2021. |
| PMSS 3 | Particulate crosslinked polymethylsilsequioxane having a number-based mean equivalent spherical diameter of 3.0 micrometers determined by the electrical sensing zone method according to ISO 13319-1: 2021. |
| PMSS 4 | Particulate crosslinked polymethylsilsequioxane having a number-based mean equivalent spherical diameter of 4.5 micrometers determined by the electrical sensing zone method according to ISO 13319-1: 2021. |
| PETS | Pentaerythritol tetrastearate, CAS Reg. No. 115-83-3. |
| TBPP | Tris(2,4-di-tert-butylphenyl)phosphite, CAS Reg. No. 31570-04-4. |

Film extrusion compositions are summarized in Table 2, along with properties of the extruded films. Component amounts are expressed in weight percent based on the total weight of the composition.

All compositions were compounded on a Werner & Pfleiderer co-rotating twin-screw extruder having a Length-to-Diameter ratio of 30:1 and a vacuum port located near the die face. Compounding was conducted at a temperature of 285-330° C. All components were added at the feed throat of the extruder. The particulate crosslinked polymethylsilsesquioxanes were added as to the extruder as pre-compounded masterbatches in the poly(carbonate-siloxane) block copolymer.

Films were extruded using a 25 millimeter single-screw extruder utilizing a melt pump to eliminate pulsating melt flow. The melt pump was adjusted to provide optimum melt pressure in the die at temperatures of 330-360° C. The melt was extruded through a vertical 450 millimeter wide t-die with a die gap clearance of 100-300 micrometers. The melt curtain was cast onto a polished chill roll and drawn down in the machine direction to a thickness of 5 micrometers. Gauge was controlled by matching the melt pump output and take-up speed of the downstream equipment to provide uniform constant film thickness.

Film properties are summarized in Table 2. "Total PMSS loading (wt %)" is the total weight percent of particulate crosslinked polymethylsilsesquioxane, based on the total weight of the composition. "Mean ESD of all PMSS (μm)" is the number-average mean equivalent spherical diameter, in units of micrometers, for all incorporated particulate crosslinked polymethylsilsesquioxanes in a particular composition, calculated from the number-average mean equivalent spherical diameters of all incorporated particulate crosslinked polymethylsilsesquioxanes in a particular film extrusion composition. "Total Number of Particles," which is unitless, is the number of particles in one nanogram of film, calculated as described above.

Surface roughness is an important physical property of the film which impacts slip directly and is essential for good handling of film web through the extrusion process, film metallization, and capacitor winding. Inadequate surface roughness can cause blocking (i.e., stickiness) and also air entrapment between the windings of the subsequent layers of film in the master roll during extrusion. Trapped gas is a primary cause of telescoping during metallization. Excessive surface roughness drops the efficiency of the wound capacitor (volume to energy ratings) and reduces the breakdown strength of the film. Surface roughness properties in Table 2 (all having units of micrometers) were determined according to JIS B0601(1994). "$R^a$" is the arithmetic mean roughness; "Ry" is the maximum height; "Rz" is the cross point average height; "S" is the average local maximum interval; "Sm" is the average irregularity interval; and "RMS" is the root mean square roughness. Values for surface roughness properties in Table 2 represent the average of values from five samples. Surface roughness properties were determined using a Keyence confocal microscope. The primary roughness image was captured on the Keyence VK-200 using a 50× objective. The sample was mounted on a flat polycarbonate plaque to minimize surface departure. The top surface of film was brought into focus using the stage height adjustment in laser measurement mode. The scan range was set manually to 1 micrometer above the film top surface to 1 micrometer below the film top surface. The total scan range did not exceed film thickness. The target Z scan range was 2-4 micrometers to ensure that the bottom side of the film was not imaged during data collection. If the entire field of view could not be captured within the targeted scan range, the sample was moved in the X and Y directions to ensure a flat image was acquired. Once the scan range was set, auto gain was implemented to establish acceptable brightness and contrast settings throughout total scan range. The double scan option was used under high accuracy settings. The Z step height was 0.1 micrometer. The measurement was made under these settings using a 50× objective providing a 280-300 millimeter by 200 millimeter field of view for data analysis. Five separate measurements were made using one 50 millimeter by 100 millimeter sample at various locations. Surface roughness measurements were made in accordance with JIS B0601(1994) standard calculations on each image. A template for multi-line scan analysis was used to calculate and report the average value determined for each of the five individual scans. The analysis included 60 lines across each image in the machine direction and was reported as an average for Ra (arithmetic mean roughness), Ry (maximum height), Rz (cross point average height), and RMS (root mean square roughness). Preprocessing of the acquired images included the following steps in accordance with Keyence recommendations: auto tilt correction; auto noise elimination; height cut level; and DCL/BCL level. Roughness curve correction: height data was generated by taking a roughness measurement on the tilt-corrected surface. This allowed the surface roughness to be determined from the line roughness cross section curve. Surface roughness determined a baseline by using the least squares method on the height data and determined the distance from that baseline of each height data point. The Ra calculation determined the absolute value of the height difference between the reference surface and the measured surface, then determined the average of the distance between each dot on the roughness curve surface and the reference surface. The Ry calculation was performed by determining the sum of the height of the highest peak (Yp) and the depth of the lowest valley (Yv) by comparing the distance between the reference surface and each point on the roughness curve surface. The Rz value was determined from the sum of the average of the absolute values of heights of the five highest peaks and the average of the absolute values of depths of the five lowest valleys. The RMS calculation indicated the square root of the sum of the squares of the difference between the reference surface and the roughness curve surface.

The Table 2 properties, "$t_p10(\%)$," "$t_p20(\%)$," "$t_p30(\%)$," "$t_p40(\%)$," "$t_p50(\%)$," "$t_p60(\%)$," "$t_p70(\%)$," "$t_p80(\%)$," and "$t_p90(\%)$," which each have units of percent, refer to load/length ratios at the specified percent value and were calculated as described above in the context of the description of the FIGURE. "Total Number of Particles," which is unitless, is the total number of crosslinked polymethylsilsesquioxane particles per nanogram of film, calculated as described above. Values for "$t_p60$/Total Number of Particles," which each have units of percent, refer to the ratio of the $t_p60$ value and the Total Number of Particles value.

Electrical properties were determined using the continuous breakdown strength test. The continuous breakdown strength test is a continuous electrical break down test procedure and apparatus that can measure the number of breakdowns in a film that occurs at a specified voltage per unit thickness. The lower the clearing counts at each voltage level, the higher the quality of the film (i.e., lower defects, scratches, wrinkles, and thickness non-uniformities). Electrical clearing counts were determined at 150, 200, 250, 300, 350, and 400 volts/micrometer. A film to be tested was sandwiched between a grounded metalized layer on a counter electrode film and a polished steel roller. The film under test and the corresponding grounded metalized film (counter electrode) were wound through the apparatus at 10 meters per minute in a roll-to-roll process. The electrical potential of the high potential roller was controlled using a BK Precision1788B power supply in conjunction with a TREK 20/20C amplifier. A Labview software control interface was used in conjunction with a National Instruments NI-9223 voltage input module to measure voltage/current spikes at specified voltages to determine the number of breakdown counts. The number and location of the breakdown counts was recorded for 1 square meter of film at each voltage. Clearing count values in Table 2 represent an average of five tests per sample.

"Telescoping" in Table 2 is a measure of the degree to which, during winding of an unmetallized roll of film, the roll, initially cylindrical in shape, encountered an imbalance of forces causing the outer layers to slide to one side or the other relative to the core and inner film layers. It was determined by visual inspection. A telescoping rating of "poor" means that telescoping could not be corrected by adjusting winding parameters. A rating of "better" means that telescoping could be avoided with a substantial modification of winding parameters. A rating of "best" means that telescoping did not occur under normal winding conditions.

"Blocking" in Table 2 is a measure of the degree to which, during unwinding of a roll of a metallized film, film layers cannot be separated from each other without distortion or breaking of the film. It was determined by visual inspection of metallized films after unwinding. A blocking rating of "poor" means that interlayer adhesion caused layers to stick and tear, or caused a metal layer to be removed from the film. A rating of "better" means that sticking could be mitigated with substantial modifications to metallization and/or winding parameters. A rating of "best" means that sticking could be mitigated without substantial modifications to metallization or winding parameters.

The results in Table 2 show that inventive Examples 1-5, incorporating 0.6 to 0.7 weight percent of crosslinked polymethylsilsesquioxane particles having, on average, a diameter of 1.4 to 2.5 micrometers, all exhibit "better" or "best" values for telescoping and blocking, and further exhibit good dielectric properties as evidenced by acceptably low values for "Clearing counts at 350 V/μm (counts/m$^2$)" (i.e., all values less than or equal to 59.4). Exceptional performance is exhibited by Examples 1 and 2, which exhibit "best" values for telescoping and blocking, and values less than or equal to 18.6 for "Clearing counts at 350 V/μm (counts/m$^2$)."

In contrast, each of the Comparative Examples is deficient in at least one of telescoping, blocking, and dielectric properties. Comparative Examples 1-5, incorporating 0.3 to 0.45 weight percent of crosslinked polymethylsilsesquioxane particles with a diameter of 2 micrometers, achieved "better" ratings in telescoping and blocking, which are substantially worse than the "best" ratings in telescoping and blocking exhibited by Examples 1 and 2 with 0.6 weight percent of the same crosslinked polymethylsilsesquioxane particles. Comparative Example 6, with a combination of 0.2 weight percent 2 micrometer particles and 0.2 weight percent of 4.5 micrometer particles, exhibited a "better" rating in blocking—making it inferior to Examples 1-4 with blocking ratings of "best"- and a value of 16.5 for "Clearing counts at 350 V/μm (counts/m$^2$)"—making it inferior to the value of 1.8 for Example 5. Comparative Examples 7-9, incorporating 0.3 to 0.45 weight percent of 0.7 micrometer particles, all exhibited "poor" ratings for telescoping. Comparative Examples 10-14, incorporating 0.3 to 0.45 weight percent of 4.5 micrometer particles, all exhibited "poor" ratings for blocking.

The working examples also demonstrate that the parameter, "$t_p$60/Total Number of Particles," is a useful, if imperfect, predictor of an improved balance of telescoping and blocking. Specifically, of the five inventive examples exhibiting an improved balance of telescoping and blocking, three have "$t_p$60/Total Number of Particles" values between 0.1 and 0.5 (Examples 1, 2, and 5). The parameter accounts for particle size, particle number, and particle spacing.

The working examples collectively demonstrate that an improved balance of telescoping, blocking, and dielectric properties is provided by an extruded film that incorporates 0.55 to 0.8 weight percent of crosslinked polymethylsilsesquioxane particles having a diameter, on average, of 0.5 to 4 micrometers.

TABLE 2

|  | Ex. 1 | Ex. 2 | Ex. 3 | Ex. 4 | Ex. 5 |
|---|---|---|---|---|---|
| COMPOSITIONS | | | | | |
| HHPC 1 | 0 | 96.04 | 96.04 | 0 | 95.94 |
| HHPC 2 | 96.04 | 0 | 0 | 96.04 | 0 |
| PETS | 0.30 | 0.30 | 0.30 | 0.30 | 0.30 |
| TBPP | 0.06 | 0.06 | 0.06 | 0.06 | 0.06 |
| PC-Si | 3.00 | 3.00 | 3.00 | 3.00 | 3.00 |
| PMSS 1 | 0 | 0 | 0.30 | 0.30 | 0 |
| PMSS 2 | 0.60 | 0.60 | 0.30 | 0.30 | 0.40 |
| PMSS 3 | 0 | 0 | 0 | 0 | 0.30 |
| PMSS 4 | 0 | 0 | 0 | 0 | 0 |
| PROPERTIES | | | | | |
| Total PMSS loading (wt %) | 0.6 | 0.6 | 0.6 | 0.6 | 0.7 |
| Mean ESD of all PMSS (μm) | 2.0 | 2.0 | 1.4 | 1.4 | 2.5 |
| Total Number of Particles | 10.9 | 10.9 | 132 | 132 | 8.25 |
| Ra (μm) | 0.070 | 0.056 | 0.056 | 0.068 | 0.074 |
| Ry (μm) | 0.554 | 0.520 | 0.462 | 0.500 | 0.654 |
| Rz (μm) | 0.248 | 0.304 | 0.242 | 0.216 | 0.316 |
| Sm (μm) | 26.73 | 15.60 | 15.16 | 21.37 | 21.88 |
| S (μm) | 1.51 | 1.36 | 1.31 | 1.80 | 1.31 |
| $t_p$10 (%) | 1.06 | 1.12 | 0.72 | 1.20 | 0.80 |
| $t_p$20 (%) | 2.55 | 4.36 | 1.86 | 3.33 | 1.99 |
| $t_p$30 (%) | 5.43 | 10.35 | 3.85 | 7.59 | 4.14 |
| $t_p$40 (%) | 11.57 | 17.35 | 8.12 | 14.88 | 8.01 |
| $t_p$50 (%) | 21.50 | 24.74 | 15.94 | 27.27 | 14.91 |
| $t_p$60 (%) | 34.36 | 34.61 | 29.25 | 44.15 | 26.13 |
| $t_p$70 (%) | 50.68 | 50.69 | 48.59 | 61.87 | 44.40 |
| $t_p$80 (%) | 69.58 | 72.03 | 72.32 | 78.66 | 68.92 |
| $t_p$90 (%) | 86.80 | 91.07 | 91.68 | 92.98 | 89.16 |
| RMS (μm) | 0.094 | 0.076 | 0.074 | 0.084 | 0.100 |
| $t_p$60/Total Number of Particles (%) | 0.317 | 0.319 | 0.022 | 0.033 | 0.317 |
| Clearing counts at 150 V/μm (counts/m$^2$) | 0 | 0 | 0 | 0 | 0 |
| Clearing counts at 200 V/μm (counts/m$^2$) | 0.4 | 0.4 | 0.6 | 0.2 | 0.2 |
| Clearing counts at 250 V/μm (counts/m$^2$) | 1.6 | 1.0 | 1.4 | 1.2 | 0.8 |
| Clearing counts at 300 V/μm (counts/m$^2$) | 6.2 | 2.4 | 3.6 | 8.6 | 1.0 |

TABLE 2-continued

| | | | | | |
|---|---|---|---|---|---|
| Clearing counts at 350 V/μm (counts/m²) | 18.6 | 7.8 | 59.4 | 33.0 | 1.8 |
| Clearing counts at 400 V/μm (counts/m²) | 83.0 | 30.4 | 273.2 | 112.6 | 5.8 |
| Telescoping | best | best | better | better | better |
| Blocking | best | best | best | best | better |

| | C. Ex. 1 | C. Ex. 2 | C. Ex. 3 | C. Ex. 4 | C. Ex. 5 |
|---|---|---|---|---|---|
| COMPOSITIONS | | | | | |
| HHPC 1 | 96.19 | 96.19 | 96.34 | 96.34 | 96.34 |
| HHPC 2 | 0 | 0 | 0 | 0 | 0 |
| PETS | 0.30 | 0.30 | 0.30 | 0.30 | 0.30 |
| TBPP | 0.06 | 0.06 | 0.06 | 0.06 | 0.06 |
| PC-Si | 3.0 | 3.0 | 3.0 | 3.0 | 3.0 |
| PMSS 1 | 0 | 0 | 0 | 0 | 0 |
| PMSS 2 | 0.45 | 0.45 | 0.30 | 0.30 | 0.30 |
| PMSS 3 | 0 | 0 | 0 | 0 | 0 |
| PMSS 4 | 0 | 0 | 0 | 0 | 0 |
| PROPERTIES | | | | | |
| Total PMSS loading (wt %) | 0.45 | 0.45 | 0.3 | 0.3 | 0.4 |
| Mean ESD of all PMSS (μm) | 2.0 | 2.0 | 2.0 | 2.0 | 2.0 |
| Total Number of Particles | 8.14 | 8.14 | 5.43 | 5.43 | 5.43 |
| Ra (μm) | 0.068 | 0.030 | 0.054 | 0.066 | 0.062 |
| Ry (μm) | 0.458 | 0.208 | 0.398 | 0.466 | 0.412 |
| Rz (μm) | 0.234 | 0.138 | 0.190 | 0.178 | 0.188 |
| Sm (μm) | 25.73 | 9.57 | 24.61 | 24.74 | 25.80 |
| S (μm) | 1.37 | 1.32 | 1.29 | 1.20 | 1.27 |
| $t_p10$ (%) | 1.20 | 0.90 | 1.30 | 1.55 | 1.55 |
| $t_p20$ (%) | 3.22 | 3.11 | 3.38 | 4.16 | 4.07 |
| $t_p30$ (%) | 7.16 | 8.47 | 6.89 | 8.74 | 9.18 |
| $t_p40$ (%) | 14.79 | 19.12 | 13.48 | 16.00 | 17.37 |
| $t_p50$ (%) | 27.90 | 35.09 | 24.23 | 28.16 | 29.49 |
| $t_p60$ (%) | 45.41 | 54.29 | 40.15 | 45.97 | 45.32 |
| $t_p70$ (%) | 63.61 | 73.17 | 59.52 | 64.07 | 63.70 |
| $t_p80$ (%) | 79.81 | 87.94 | 78.44 | 80.31 | 79.79 |
| $t_p90$ (%) | 92.62 | 96.63 | 91.88 | 91.99 | 91.99 |
| RMS (μm) | 0.082 | 0.040 | 0.070 | 0.084 | 0.074 |
| $t_p60$/Total Number of Particles (%) | 0.558 | 0.667 | 0.740 | 0.847 | 0.835 |
| Clearing counts at 150 V/μm (counts/m²) | 0 | 0.2 | 0 | 0 | 0 |
| Clearing counts at 200 V/μm (counts/m²) | 0.8 | 0 | 0.2 | 0 | 0.2 |
| Clearing counts at 250 V/μm (counts/m²) | 3.4 | 3.6 | 0.4 | 0.6 | 4.2 |
| Clearing counts at 300 V/μm (counts/m²) | 10.6 | 15.2 | 16.6 | 1.8 | 14.4 |
| Clearing counts at 350 V/μm (counts/m²) | 51.4 | 75.2 | 55.0 | 5.8 | 48.0 |
| Clearing counts at 400 V/μm (counts/m²) | 221.6 | 280.8 | 187.2 | 22.4 | 180.4 |
| Telescoping | better | better | better | better | better |
| Blocking | better | better | better | best | best |

| | C. Ex. 6 | C. Ex. 7 | C. Ex. 8 | C. Ex. 9 | C. Ex. 10 |
|---|---|---|---|---|---|
| COMPOSITIONS | | | | | |
| HHPC 1 | 96.24 | 96.19 | 96.34 | 96.34 | 96.24 |
| HHPC 2 | 0 | 0 | 0 | 0 | 0 |
| PETS | 0.30 | 0.30 | 0.30 | 0.30 | 0.30 |
| TBPP | 0.06 | 0.06 | 0.06 | 0.06 | 0.06 |
| PC-Si | 3.0 | 3.0 | 3.0 | 3.0 | 3.0 |
| PMSS 1 | 0 | 0.45 | 0.3 | 0.3 | 0 |
| PMSS 2 | 0.2 | 0 | 0 | 0 | 0 |
| PMSS 3 | 0 | 0 | 0 | 0 | 0 |
| PMSS 4 | 0.2 | 0 | 0 | 0 | 0.4 |

TABLE 2-continued

| PROPERTIES | | | | | |
|---|---|---|---|---|---|
| Total PMSS loading (wt %) | 0.4 | 0.45 | 0.3 | 0.3 | 0.4 |
| Mean ESD of all PMSS (μm) | 3.25 | 0.7 | 0.7 | 0.7 | 4.5 |
| Total Number of Particles | 3.93 | 190 | 127 | 127 | 0.64 |
| Ra (μm) | 0.102 | 0.030 | 0.022 | 0.042 | 0.098 |
| Ry (μm) | 0.682 | 0.214 | 0.168 | 0.262 | 0.730 |
| Rz (μm) | 0.306 | 0.124 | 0.114 | 0.102 | 0.288 |
| Sm (μm) | 64.33 | 10.13 | 9.17 | 14.12 | 50.64 |
| S (μm) | 1.80 | 1.32 | 1.25 | 1.29 | 1.39 |
| $t_p10$ (%) | 3.23 | 0.90 | 0.92 | 1.65 | 3.80 |
| $t_p20$ (%) | 6.60 | 2.87 | 3.16 | 5.68 | 8.47 |
| $t_p30$ (%) | 11.63 | 7.10 | 8.34 | 13.67 | 14.72 |
| $t_p40$ (%) | 19.61 | 15.21 | 18.86 | 24.90 | 22.69 |
| $t_p50$ (%) | 29.82 | 28.62 | 35.60 | 37.90 | 32.53 |
| $t_p60$ (%) | 42.86 | 47.30 | 55.74 | 51.83 | 44.77 |
| $t_p70$ (%) | 59.74 | 67.97 | 75.18 | 67.43 | 61.01 |
| $t_p80$ (%) | 76.31 | 85.24 | 89.61 | 81.92 | 78.05 |
| $t_p90$ (%) | 90.20 | 95.91 | 97.36 | 94.22 | 91.27 |
| RMS (μm) | 0.134 | 0.040 | 0.032 | 0.050 | 0.130 |
| $t_p60$/Total Number of Particles (%) | 1.09 | 0.025 | 0.044 | 0.041 | 7.05 |
| Clearing counts at 150 V/μm (counts/m$^2$) | 0 | 0 | 0 | 0 | — |
| Clearing counts at 200 V/μm (counts/m$^2$) | 1.0 | 0.2 | 0 | 0 | 2.3 |
| Clearing counts at 250 V/μm (counts/m$^2$) | 2.5 | 3.6 | 3.4 | 2.8 | 3.8 |
| Clearing counts at 300 V/μm (counts/m$^2$) | 9.0 | 20.2 | 20.4 | 9.2 | 11.5 |
| Clearing counts at 350 V/μm (counts/m$^2$) | 16.5 | 39.4 | 101.0 | 40.0 | — |
| Clearing counts at 400 V/μm (counts/m$^2$) | 63.3 | 133.4 | 281.2 | 159.4 | — |
| Telescoping | better | poor | poor | poor | better |
| Blocking | best | poor | best | best | poor |

| | C. Ex. 11 | C. Ex. 12 | C. Ex. 13 | C. Ex. 14 |
|---|---|---|---|---|
| COMPOSITIONS | | | | |
| HHPC 1 | 96.19 | 96.19 | 96.34 | 96.34 |
| HHPC 2 | 0 | 0 | 0 | 0 |
| PETS | 0.30 | 0.30 | 0.30 | 0.30 |
| TBPP | 0.06 | 0.06 | 0.06 | 0.06 |
| PC-Si | 3.0 | 3.0 | 3.0 | 3.0 |
| PMSS 1 | 0 | 0 | 0 | 0 |
| PMSS 2 | 0 | 0 | 0 | 0 |
| PMSS 3 | 0 | 0 | 0 | 0 |
| PMSS 4 | 0.45 | 0.45 | 0.30 | 0.30 |
| PROPERTIES | | | | |
| Total PMSS loading (wt %) | 0.45 | 0.45 | 0.30 | 0.30 |
| Mean ESD of all PMSS (μm) | 4.5 | 4.5 | 4.5 | 4.5 |
| Total Number of Particles | 0.72 | 0.72 | 4.76 | 4.76 |
| Ra (μm) | 0.152 | 0.126 | 0.110 | 0.124 |
| Ry (μm) | 1.046 | 1.006 | 0.810 | 0.734 |
| Rz (μm) | 0.460 | 0.496 | 0.326 | 0.350 |
| Sm (μm) | 57.46 | 41.75 | 47.34 | 74.58 |
| S (μm) | 1.46 | 1.37 | 1.35 | 1.38 |
| $t_p10$ (%) | 5.86 | 4.25 | 4.96 | 5.55 |
| $t_p20$ (%) | 13.30 | 12.43 | 11.81 | 13.36 |
| $t_p30$ (%) | 23.46 | 25.37 | 21.52 | 23.11 |
| $t_p40$ (%) | 35.57 | 40.08 | 32.32 | 33.11 |
| $t_p50$ (%) | 50.42 | 56.09 | 44.69 | 44.59 |
| $t_p60$ (%) | 65.20 | 70.37 | 57.97 | 57.43 |
| $t_p70$ (%) | 77.80 | 82.39 | 71.47 | 71.34 |
| $t_p80$ (%) | 88.45 | 90.70 | 83.87 | 83.28 |
| $t_p90$ (%) | 95.14 | 95.92 | 92.71 | 92.55 |
| RMS (μm) | 0.192 | 0.166 | 0.146 | 0.154 |
| $t_p60$/Total Number of Particles (%) | 9.12 | 9.85 | 12.17 | 12.06 |
| Clearing counts at 150 V/μm (counts/m$^2$) | 0 | 0 | 0 | 0.4 |
| Clearing counts at 200 V/μm (counts/m$^2$) | 2.2 | 0.2 | 0 | 0 |
| Clearing counts at 250 V/μm (counts/m$^2$) | 6.2 | 1.4 | 0.8 | 2.4 |
| Clearing counts at 300 V/μm (counts/m$^2$) | 15.0 | 8.4 | 5.4 | 23.2 |
| Clearing counts at 350 V/μm (counts/m$^2$) | 61.4 | 62.4 | 37.0 | 73.0 |
| Clearing counts at 400 V/μm (counts/m$^2$) | 220.4 | 276.4 | 137.4 | 251.2 |
| Telescoping | best | best | best | best |
| Blocking | poor | poor | poor | poor |

The invention claimed is:

1. A film extrusion composition comprising, based on the total weight of the film extrusion composition:

50 to 99.35 weight percent of a copolycarbonate comprising, based on 100 mole percent total carbonate units in the copolycarbonate, 20 to 60 mole percent of first carbonate units having the structure

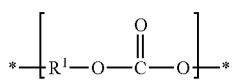

wherein $R^1$ is a $C_6$-$C_{16}$ divalent aromatic group;

40 to 80 mole percent of second carbonate units having the structure

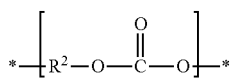

wherein $R^2$ is a $C_{17}$-$C_{40}$ divalent aromatic group having the structure

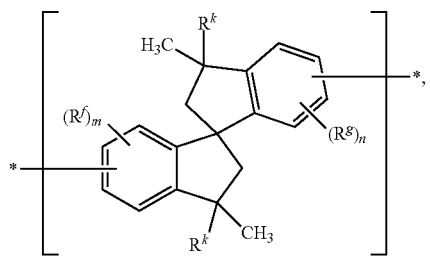

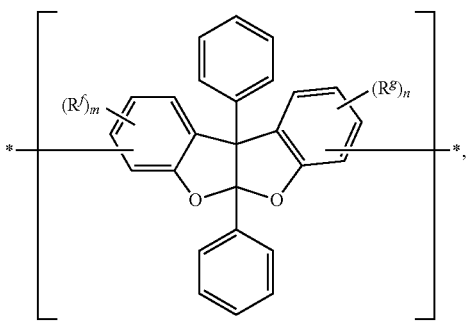

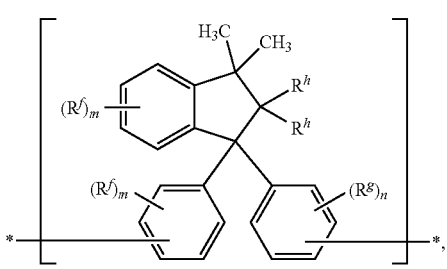

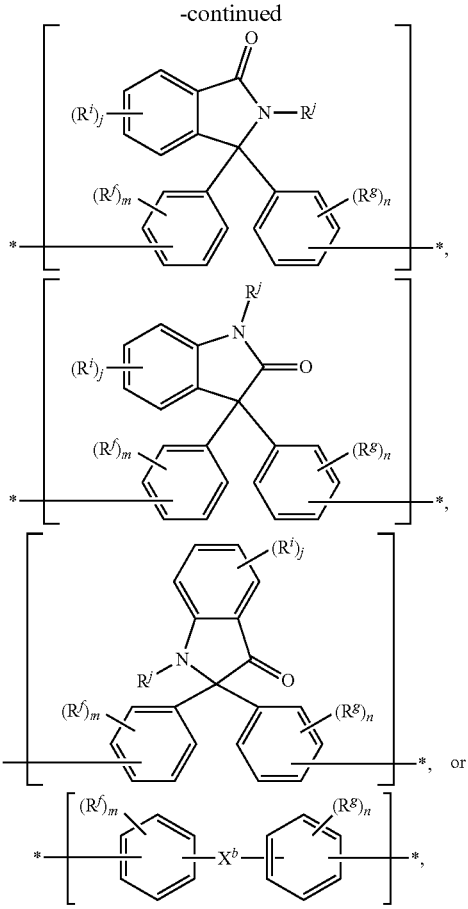

wherein $R^f$ and $R^g$ are each independently at each occurrence $C_1$-$C_{12}$ alkyl, $C_1$-$C_{12}$ alkoxyl, or $C_2$-$C_{12}$ alkenyl; each $R^h$ is hydrogen or two occurrence of $R^h$ combine with the carbon atom to which they are attached to form a carbonyl group; each occurrence of $R^i$ is independently $C_1$-$C_6$ alkyl; $R^j$ is hydrogen, $C_1$-$C_6$ alkyl, or phenyl optionally substituted with 1, 2, 3, 4, or 5 $C_1$-$C_6$ alkyl groups; $R^k$ is independently at each occurrence $C_1$-$C_3$ alkyl or phenyl, preferably methyl; $X^b$ is $C_6$-$C_{12}$ arylene, $C_4$-$C_{18}$ cycloalkylene, $C_4$-$C_{18}$ cycloalkylidene, or —C($R^m$)($R^n$)— wherein $R^m$ is hydrogen, $C_1$-$C_{12}$ alkyl, or $C_6$-$C_{12}$ aryl, and $R^n$ is $C_6$-$C_{10}$ alkyl, $C_6$-$C_8$ cycloalkyl, or $C_6$-$C_{12}$ aryl, or $X^b$ is -$(Q^a)_x$-G-$(Q^b)_y$-, wherein $Q^a$ and $Q^b$ are each independently $C_1$-$C_3$ alkylene, G is $C_3$-$C_{10}$ cycloalkylene, x is zero or 1, and y is zero or 1; and j, m, and n are each independently zero, 1, 2, 3, or 4; and 0 mole percent of third carbonate units, each third carbonate unit comprising a divalent carbonate group and a divalent polysiloxane group, the divalent polysiloxane group comprising 5 to 60 diorganosiloxane units having the structure

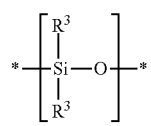

wherein each occurrence of $R^3$ is independently a $C_1$-$C_{13}$ hydrocarbyl group;
0.1 to 6 weight percent of a slip agent selected from the group consisting of pentaerythritol tetrastearate, dipentaerythritol hexastearate, glycerol tristearate, high density polyethylenes, polymethylpentenes, poly(carbonate-siloxane) s, and combinations thereof; and
0.55 to 0.8 weight percent of a particulate crosslinked polymethylsilsesquioxane having a number-based mean equivalent spherical diameter of 0.5 to 4 micrometers determined by electrical sensing zone method according to ISO 13319-1:2021.

2. The film extrusion composition of claim 1, wherein a ratio, $t_p60$/(total number of particles), is 0.1 to 0.5 percent, wherein $t_p60$ is the load/length ratio at 60 percent, expressed in units of percent, calculated according to JIS B0601 (1994) using the formula $$t_p60 = ((L_1 + L_2 + L_3 + \ldots L_n)/L) \times 100$$

wherein $(L_1+L_2+L_3+ \ldots L_n)$ is the sum of cut portion lengths measured along a measurement length, L, at a cut line level of 60% of the separation between the highest peak height (corresponding to 0%) and the lowest trough bottom (corresponding to 100%); and wherein the total number of particles is the number of the crosslinked polymethylsilsesquioxane particles in one nanogram of extruded film, calculated from the weight of crosslinked polymethylsilsesquioxane particles in one nanogram of film extrusion composition, the density of the particles, and the number-based mean equivalent spherical diameter of the particles.

3. The film extrusion composition of claim 1, wherein the particulate crosslinked polymethylsilsesquioxane comprises, based on the total weight of the film extrusion composition, 0.55 to 0.7 weight percent of particles having a number-based mean equivalent spherical diameter of 1.5 to 2.5 micrometers.

4. The film extrusion composition of claim 1, wherein the particulate crosslinked polymethylsilsesquioxane comprises, based on the total weight of the film extrusion composition, 0.2 to 0.6 weight percent of first particles having a number-based mean equivalent spherical diameter of 0.5 to 1 micrometers, and 0.2 to 0.6 weight percent of second particles having a number-based mean equivalent spherical diameter of 1.5 to 3 micrometers.

5. The film extrusion composition of claim 1, wherein the particulate crosslinked polymethylsilsesquioxane comprises, based on the total weight of the film extrusion composition, 0.2 to 0.6 weight percent of first particles having a number-based mean equivalent spherical diameter of 1.5 to 2.4 micrometers, and 0.2 to 0.6 weight percent of second particles having a number-based mean equivalent spherical diameter of 2.5 to 4 micrometers.

6. The film extrusion composition of claim 1, wherein the slip agent is selected from the group consisting of
pentaerythritol tetrastearate;
a poly(carbonate-siloxane) block copolymer comprising, based on the weight of the poly(carbonate-siloxane) block copolymer, 70 to 90 weight percent of bisphenol A carbonate units and 10 to 30 weight percent of dimethylsiloxane units, based on the weight of the poly(carbonate-siloxane) block copolymer; and
a combination of pentaerythritol tetrastearate and the poly(carbonate-siloxane) block copolymer.

7. The film extrusion composition of claim 1,
wherein the film extrusion composition comprises
90 to 99.25 weight percent of the copolycarbonate,
0.2 to 5 weight percent of the slip agent, and
0.55 to 0.7 weight percent of the particulate crosslinked polymethylsilsesquioxane; and
wherein the copolycarbonate comprises
50 to 75 mole percent of 3,3,5-trimethylcyclohexanonebisphenol carbonate units, and
25 to 50 mole percent of bisphenol A carbonate units.

8. The film extrusion composition of claim 7, wherein the particulate crosslinked polymethylsilsesquioxane comprises, based on the total weight of the film extrusion composition, 0.55 to 0.7 weight percent of particles having a number-based mean equivalent spherical diameter of 1.5 to 2.5 micrometers.

9. An extruded film comprising the film extrusion composition of claim 1.

10. The extruded film of claim 9,
wherein the film extrusion composition comprises
90 to 99.25 weight percent of the copolycarbonate,
0.2 to 5 weight percent of the slip agent, and
0.55 to 0.7 weight percent of the particulate crosslinked polymethylsilsesquioxane; and
wherein the copolycarbonate comprises
50 to 75 mole percent of 3,3,5-trimethylcyclohexanonebisphenol carbonate units, and
25 to 50 mole percent of bisphenol A carbonate units.

11. The extruded film of claim 10, wherein the particulate crosslinked polymethylsilsesquioxane comprises, based on the total weight of the film extrusion composition, 0.55 to 0.7 weight percent of particles having a number-based mean equivalent spherical diameter of 1.5 to 2.5 micrometers.

12. A capacitor comprising:
an extruded film comprising the film extrusion composition of claim 1; and
an electrically conductive metal layer in contact with the extruded film.

13. The capacitor of claim 12,
wherein the film extrusion composition comprises
90 to 99.25 weight percent of the copolycarbonate,
0.2 to 5 weight percent of the slip agent, and
0.55 to 0.7 weight percent of the particulate crosslinked polymethylsilsesquioxane; and
wherein the copolycarbonate comprises
50 to 75 mole percent of 3,3,5-trimethylcyclohexanonebisphenol carbonate units, and
25 to 50 mole percent of bisphenol A carbonate units.

14. The capacitor of claim 13, wherein the particulate crosslinked polymethylsilsesquioxane comprises, based on the total weight of the film extrusion composition, 0.55 to 0.7 weight percent of particles having a number-based mean equivalent spherical diameter of 1.5 to 2.5 micrometers.

15. A metallized film comprising:
an extruded film comprising the film extrusion composition of claim 1; and
an electrically conductive metal layer in contact with the extruded film.

* * * * *